US012349789B2

(12) United States Patent
Larkner et al.

(10) Patent No.: US 12,349,789 B2
(45) Date of Patent: *Jul. 8, 2025

(54) UNDERCOUNTER REFRIGERATOR WITH ACCESS CONTROL

(71) Applicant: HELMER SCIENTIFIC, LLC, Davidson, NC (US)

(72) Inventors: Thomas J. Larkner, Noblesville, IN (US); Adam A. Cloud, Noblesville, IN (US); Jason L. Hessler, Noblesville, IN (US); Dennis H. Smith, Noblesville, IN (US); Kyle T. Stout, Noblesville, IN (US); Doug R. Sanqunetti, Noblesville, IN (US); Bryan T. Shannon, Noblesville, IN (US)

(73) Assignee: HELMER SCIENTIFIC, LLC, Davidson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/466,607

(22) Filed: Sep. 13, 2023

(65) Prior Publication Data

US 2024/0000226 A1 Jan. 4, 2024

Related U.S. Application Data

(63) Continuation of application No. 16/756,634, filed as application No. PCT/US2018/056309 on Oct. 17, 2018, now Pat. No. 11,805,898.

(Continued)

(51) Int. Cl.

| | |
|---|---|
| ***A47B 67/02*** | (2006.01) |
| ***A47B 88/457*** | (2017.01) |

(Continued)

(52) U.S. Cl.

CPC ............ *A47B 67/02* (2013.01); *A47B 88/457* (2017.01); *E05B 65/462* (2013.01); *G07F 9/026* (2013.01);

(Continued)

(58) Field of Classification Search

CPC ..... A47B 67/02; A47B 88/457; E05B 65/462; G07F 9/026; G07F 9/105; G07F 11/62

(Continued)

(56) References Cited

U.S. PATENT DOCUMENTS

| | | | |
|---|---|---|---|
| 2,123,803 | A | 7/1938 | Regenhardt |
| 2,501,932 | A | 3/1950 | Budai et al. |

(Continued)

FOREIGN PATENT DOCUMENTS

| | | | |
|---|---|---|---|
| AU | 2014292968 | A1 | 2/2016 |
| EP | 1467331 | | 10/2004 |

(Continued)

OTHER PUBLICATIONS

Extended European Search Report, European Application No. 18868381.7-1213, dated Jun. 17, 2021, 8 pages.

(Continued)

*Primary Examiner* — Daniel J Troy
*Assistant Examiner* — Timothy M Ayres
(74) *Attorney, Agent, or Firm* — Womble Bond Dickinson (US) LLP

(57) ABSTRACT

An embodiment of a medical product storage device including an enclosure at least partially defined by a door and a plurality of drawer assemblies positioned in the enclosure. Each of the plurality of drawer assemblies defining a respective compartment within the enclosure. In addition, each of the plurality of drawer assemblies includes a plurality of storage containers positioned within the compartment; and a plurality of actuators that are coupled to a back end of the (Continued)

drawer assembly that is spaced from the door such that each of the plurality of actuators is configured to selectively secure or release a respective storage container of the plurality of storage containers relative to the compartment, and such that the drawer assembly is configured to be removed from the enclosure as a unit with the plurality of actuators.

14 Claims, 22 Drawing Sheets

Related U.S. Application Data

(60) Provisional application No. 62/573,418, filed on Oct. 17, 2017.

(51) Int. Cl.

| | |
|---|---|
| ***E05B 65/462*** | (2017.01) |
| ***G07F 9/02*** | (2006.01) |
| ***G07F 9/10*** | (2006.01) |
| ***G07F 11/62*** | (2006.01) |
| ***G07F 17/00*** | (2006.01) |

(52) U.S. Cl.
CPC .............. *G07F 9/105* (2013.01); *G07F 11/62* (2013.01); *G07F 17/0092* (2013.01)

(58) Field of Classification Search
USPC .......................................................... 312/221
See application file for complete search history.

(56) References Cited

U.S. PATENT DOCUMENTS

| | | | |
|---|---|---|---|
| 3,068,023 | A | 12/1962 | Fiala |
| 4,411,139 | A | 10/1983 | Bos |
| 4,441,329 | A | 4/1984 | Dawley |
| 4,463,348 | A | 7/1984 | Sidebottom |
| 4,560,088 | A | 12/1985 | Tan |
| 4,566,285 | A | 1/1986 | Tershak et al. |
| 4,616,890 | A | 10/1986 | Romick |
| 5,025,950 | A | 6/1991 | Trouteaud et al. |
| 5,139,321 | A | 8/1992 | Beardsley |
| 5,262,758 | A | 11/1993 | Nam et al. |
| 5,314,244 | A | 5/1994 | Swets |
| 5,409,312 | A | 4/1995 | Fletcher |
| 5,596,878 | A | 1/1997 | Hanson et al. |
| 5,623,836 | A | 4/1997 | Mrozinsky et al. |
| 5,661,978 | A | 9/1997 | Holms et al. |
| 5,716,114 | A | 2/1998 | Holmes |
| 5,735,587 | A | 4/1998 | Malin et al. |
| 5,745,366 | A | 4/1998 | Higham |
| 5,905,653 | A | 5/1999 | Higham et al. |
| 6,011,999 | A | 1/2000 | Holmes |
| 6,021,392 | A | 2/2000 | Lester et al. |
| 6,116,067 | A | 9/2000 | Myers et al. |
| 6,116,461 | A | 9/2000 | Broadfield |
| 6,119,471 | A | 9/2000 | Tanaka et al. |
| 6,129,428 | A | 10/2000 | Helwig et al. |
| 6,151,536 | A | 11/2000 | Arnold et al. |
| 6,274,374 | B1 | 8/2001 | Astle |
| 6,338,007 | B1 | 1/2002 | Broadfield et al. |
| 6,401,466 | B1 | 6/2002 | Olsen |
| 6,475,776 | B1 | 11/2002 | Higuchi |
| 6,489,168 | B1 | 12/2002 | Wang et al. |
| 6,532,399 | B2 | 3/2003 | Mase |
| 6,536,859 | B1 | 3/2003 | Bathe |
| 6,568,770 | B2 | 5/2003 | Gonska et al. |
| 6,595,430 | B1 | 7/2003 | Shah |
| 6,658,322 | B1 | 12/2003 | Frederick et al. |
| 6,691,058 | B2 | 2/2004 | Blakley |
| 6,707,381 | B1 | 3/2004 | Maloney |
| 6,752,479 | B2 | 6/2004 | Ferger et al. |
| 6,788,997 | B1 | 9/2004 | Frederick |
| 6,810,350 | B2 | 10/2004 | Blakley |
| 6,874,684 | B1 | 4/2005 | Denenberg et al. |
| 6,935,560 | B2 | 8/2005 | Andreasson et al. |
| 6,988,248 | B1 | 1/2006 | Tang et al. |
| 7,158,030 | B2 | 1/2007 | Chung |
| 7,178,729 | B2 | 2/2007 | Shaffer et al. |
| 7,209,045 | B2 | 4/2007 | De et al. |
| 7,232,006 | B2 | 6/2007 | Dominke et al. |
| 7,232,066 | B2 | 6/2007 | Andreasson et al. |
| 7,263,410 | B1 | 8/2007 | Frederick et al. |
| 7,317,393 | B2 | 1/2008 | Maloney |
| 7,348,884 | B2 | 3/2008 | Higham |
| 7,544,329 | B2 | 6/2009 | Malin |
| 7,570,786 | B2 | 8/2009 | Ateya |
| 7,617,690 | B2 | 11/2009 | Dawes |
| 7,630,791 | B2 | 12/2009 | Nguyen et al. |
| 7,638,100 | B2 | 12/2009 | Dawes |
| 7,661,591 | B2 | 2/2010 | Dearing et al. |
| 7,668,620 | B2 | 2/2010 | Shoenfeld |
| 7,719,420 | B2 | 5/2010 | Christie et al. |
| 7,765,829 | B2 | 8/2010 | Zenobi |
| 7,775,056 | B2 | 8/2010 | Lowenstein |
| 7,806,488 | B2 | 10/2010 | Hannan |
| 7,942,321 | B2 | 5/2011 | Linton et al. |
| 7,992,746 | B2 | 8/2011 | Weber |
| 8,006,903 | B2 | 8/2011 | Braun et al. |
| 8,025,149 | B2 | 9/2011 | Sterry et al. |
| 8,036,773 | B2 | 10/2011 | Braun et al. |
| 8,063,735 | B2 | 11/2011 | Shoenfeld |
| 8,065,035 | B2 | 11/2011 | Ross et al. |
| 8,068,023 | B2 | 11/2011 | Dulin et al. |
| 8,068,934 | B2 | 11/2011 | Saltsov |
| 8,103,379 | B2 | 1/2012 | Biba et al. |
| 8,113,007 | B2 | 2/2012 | Zenobi et al. |
| 8,285,607 | B2 | 10/2012 | Danilewitz |
| 8,376,228 | B2 | 2/2013 | Devet et al. |
| 8,405,508 | B2 | 3/2013 | Burke |
| 8,473,097 | B2 | 6/2013 | Shoenfeld |
| 8,517,215 | B2 | 8/2013 | Shafir |
| 8,554,364 | B2 | 10/2013 | Holmes |
| 8,704,642 | B2 | 4/2014 | Chen |
| 8,731,958 | B2 | 5/2014 | Barrett et al. |
| 8,744,620 | B2 | 6/2014 | Shavelsky et al. |
| 8,914,148 | B2 | 12/2014 | Wagner |
| 8,972,051 | B2 | 3/2015 | Rahilly et al. |
| 8,983,653 | B2 | 3/2015 | Barrett |
| 9,081,887 | B2 | 7/2015 | Olson et al. |
| 9,131,774 | B2 | 9/2015 | Weber |
| 9,155,682 | B2 | 10/2015 | Boyd |
| 9,157,261 | B2 | 10/2015 | Rahilly |
| 9,224,124 | B2 | 12/2015 | Rahim et al. |
| 9,295,331 | B2 | 3/2016 | Slogoff |
| 9,345,644 | B2 | 5/2016 | Michael |
| 9,460,413 | B2 | 10/2016 | Elwood et al. |
| 9,463,412 | B2 | 10/2016 | Akdogan et al. |
| 9,579,245 | B2 | 2/2017 | Larkner et al. |
| 9,652,594 | B2 * | 5/2017 | Olson ................. G07F 17/0092 |
| 9,910,965 | B2 * | 3/2018 | Bufalini ................. G16H 20/13 |
| 9,968,190 | B2 * | 5/2018 | Olson ................... A61J 7/0084 |
| 10,045,617 | B2 | 8/2018 | Lehndorf |
| 10,045,900 | B2 * | 8/2018 | Sciacchitano ....... E05B 47/0001 |
| 10,362,866 | B2 * | 7/2019 | Duval ..................... G07F 11/62 |
| 10,663,218 | B2 * | 5/2020 | Belligundu ........... F25D 23/069 |
| 10,751,239 | B2 | 8/2020 | Volek |
| 10,821,044 | B2 | 11/2020 | Larkner et al. |
| 11,226,640 | B2 | 1/2022 | Irwin |
| 11,805,898 | B2 * | 11/2023 | Larkner .................. G07F 11/62 |
| 11,883,335 | B2 | 1/2024 | Larkner et al. |
| 2003/0067388 | A1 | 4/2003 | Elwood et al. |
| 2003/0105555 | A1 | 6/2003 | Lunak et al. |
| 2004/0044326 | A1 | 3/2004 | Kranz et al. |
| 2004/0080245 | A1 | 4/2004 | Lammens et al. |
| 2004/0108795 | A1 | 6/2004 | Meek, Jr. et al. |
| 2004/0111323 | A1 | 6/2004 | Neiderland et al. |
| 2004/0113786 | A1 | 6/2004 | Maloney |
| 2004/0115101 | A1 | 6/2004 | Malin |
| 2004/0148055 | A1 | 7/2004 | Shoenfeld |
| 2004/0186620 | A1 | 9/2004 | Chirnomas |

(56) References Cited

U.S. PATENT DOCUMENTS

| | | | |
|---|---|---|---|
| 2004/0232230 | A1 | 11/2004 | Linton et al. |
| 2005/0056033 | A1 | 3/2005 | Gingras |
| 2005/0145644 | A1 | 7/2005 | Mori et al. |
| 2005/0240305 | A1 | 10/2005 | Bogash et al. |
| 2006/0093514 | A1 | 5/2006 | Dawes |
| 2007/0135965 | A1 | 6/2007 | Nguyen et al. |
| 2007/0145130 | A1 | 6/2007 | Danilewitz |
| 2007/0150382 | A1 | 6/2007 | Danilewitz |
| 2007/0192315 | A1 | 8/2007 | Drzaic et al. |
| 2007/0244598 | A1 | 10/2007 | Shoenfeld |
| 2007/0265729 | A1 | 11/2007 | Braun et al. |
| 2008/0042837 | A1 | 2/2008 | Burke |
| 2008/0104993 | A1 | 5/2008 | Zenobi et al. |
| 2008/0128444 | A1 | 6/2008 | Schininger et al. |
| 2008/0184719 | A1 | 8/2008 | Lowenstein |
| 2008/0270178 | A1 | 10/2008 | McRae et al. |
| 2008/0272138 | A1 | 11/2008 | Ross et al. |
| 2008/0307821 | A1 | 12/2008 | Zenobi |
| 2009/0089099 | A1 | 4/2009 | Kranz et al. |
| 2009/0138122 | A1 | 5/2009 | Wagner |
| 2009/0166415 | A1 | 7/2009 | Braun et al. |
| 2009/0194587 | A1 | 8/2009 | Devet et al. |
| 2009/0210089 | A1 | 8/2009 | Christie et al. |
| 2009/0212670 | A1 | 8/2009 | Bustle et al. |
| 2009/0231132 | A1 | 9/2009 | Shoenfeld |
| 2010/0114367 | A1 | 5/2010 | Barrett et al. |
| 2010/0265068 | A1 | 10/2010 | Brackmann et al. |
| 2011/0202170 | A1 | 8/2011 | Dawes et al. |
| 2012/0089248 | A1 | 4/2012 | Biba et al. |
| 2012/0130534 | A1 | 5/2012 | Wurm |
| 2012/0187815 | A1 | 7/2012 | Weber |
| 2012/0259456 | A1 | 10/2012 | Saltsov |
| 2013/0030566 | A1 | 1/2013 | Shavelsky et al. |
| 2013/0175286 | A1 | 7/2013 | Barrett et al. |
| 2013/0320032 | A1 | 12/2013 | Rahilly |
| 2013/0325175 | A1 | 12/2013 | Rahilly et al. |
| 2014/0222196 | A1 | 8/2014 | Michael |
| 2014/0225491 | A1 | 8/2014 | Shoenfeld |
| 2014/0246964 | A1 | 9/2014 | Boyd |
| 2014/0277709 | A1 | 9/2014 | Olson et al. |
| 2014/0316561 | A1 | 10/2014 | Tkachenko et al. |
| 2015/0196445 | A1 | 7/2015 | Larkner et al. |
| 2015/0317456 | A1 | 11/2015 | Olson et al. |
| 2016/0019367 | A1 | 1/2016 | Olson et al. |
| 2016/0345728 | A1 | 12/2016 | Lehndorf et al. |
| 2017/0092035 | A1 | 3/2017 | Morgan et al. |
| 2017/0284732 | A1 | 10/2017 | Cosgrove et al. |
| 2020/0268149 | A1 | 8/2020 | Larkner et al. |
| 2021/0106481 | A1 | 4/2021 | Larkner et al. |

FOREIGN PATENT DOCUMENTS

| | | | |
|---|---|---|---|
| EP | 3025249 | B1 | 2/2023 |
| ES | 2909847 | T3 | 5/2022 |
| WO | 2015/013625 | A2 | 1/2015 |

OTHER PUBLICATIONS

Singapore Office Action, Singapore Application No. 11202003465Q, dated Jul. 14, 2021, 10 pages.

PCT Search Report and Written Opinion prepared for PCT/US2018/056309, completed Dec. 5, 2018.

First Examination Report, European Application No. 14829422.6, completed Mar. 11, 2019, (8 pages).

* cited by examiner

UNDERCOUNTER REFRIGERATOR WITH ACCESS CONTROL

CROSS-REFERENCE TO RELATED APPLICATIONS

This application is a continuation of U.S. patent application Ser. No. 16/756,634, titled "UNDERCOUNTER REFRIGERATOR WITH ACCESS CONTROL," and filed Apr. 16, 2020, which is a U.S. national stage entry of PCI Application Serial No. PCT/US2018/056309, titled "UNDERCOUNTER REFRIGERATOR WITH ACCESS CONTROL," and filed Oct. 17, 2018, which further claims priority to U.S. Provisional Patent Application Ser. No. 62/573,418 titled "UNDERCOUNTER REFRIGERATOR WITH ACCESS CONTROL," filed on Oct. 17, 2017, the entire contents of each being incorporated herein by reference.

TECHNICAL FIELD

The present disclosure is related to environmentally controlled storage of medical products. More specifically, the present disclosure is related to a storage device that controls environmental conditions for medical products and includes storage containers that are subject to access controls that limit the ability to remove inventory stored in the storage containers subjected to access control and provide a level of security and inventory management for medications that have a high value or commonly diverted from the patient.

BACKGROUND

Medical supplies such as pharmaceuticals and blood products are high value commodities requiring stringent quality and inventory control measures. Medical products including medications, tissues, and blood products such as whole blood, plasma, or platelets, for example, are in limited supply and have a limited shelf life and stringent quality control requirements to maintain the quality of the products. In some cases, it is important to maintain the environment in which these products are stored within specific parameters. For example, temperature, humidity, and/or exposure to ultraviolet light may all be monitored and/or controlled.

Another aspect of the quality control requirement is that access to the medical products be limited to only those individuals who are authorized to handle the medical products. Stored items may be pre-matched to a specific individual or storage location. Authorization for access may be controlled to limit those individuals who have access to a particular storage location based on the authorization level of the individual. Some medications that are high value or commonly diverted for illegal sale or usage require additional levels of authority and conformation to remove from environmentally controlled storage device. Access control also assists in preventing materials from being removed unexpectedly and may form part of an inventory control and management system.

This can be contrasted to the need for ready access to medical products in the event of power loss or an equipment failure may be necessary to prevent medical products from being inaccessible in emergencies. Power loss generally results in the loss of temperature control. In the case of specific stored products, such as blood products, for example, the product must be quickly relocated before the storage conditions fall outside of acceptable levels. In situations where large numbers of medical products are stored in a single climate control device, quick identification of the particular location of the medical product inventory that is needed assists with productivity and limits the time spent by a user locating appropriate inventory.

SUMMARY

The present disclosure includes one or more of the features recited in the appended claims and/or the following features which, alone or in any combination, may comprise patentable subject matter.

According to a first aspect of the present disclosure, a storage device for medical products comprises a cabinet, a drawer assembly positioned in the cabinet, the drawer assembly including a plurality of storage spaces, a plurality of storage containers, each storage container associated with one of the storage spaces, an actuation assembly including an array of actuators, each of the actuators of the array being associated with a respective storage container, each of the actuators being independently actuable to secure or release the respective storage container with which the respective actuator is associated relative to the storage space, and a manual release mechanism actuable by a user to over-ride the actuation assembly and independently release the storage containers from the storage spaces.

In some embodiments, the storage space includes an arm movable between a first position in which the arm secures the storage container and a second position in which the arm releases the storage container.

In some embodiments, the arm includes a hook that engages the storage container when the arm secures the storage container and disengages the storage container when the arm releases the respective storage container.

In some embodiments, the actuator of the actuation assembly is operable to move a respective arm between the first and second positions.

In some embodiments, the storage device further includes a detector to detect the position of the arm.

In some embodiments, each actuator has an associated sensor for detecting the position of an arm adjacent the respective actuator.

In some embodiments, each actuator comprises a solenoid actuated plunger that engages the arm when the solenoid is energized to thereby move the arm between the first and second positions.

In some embodiments, the control system compares the state of the solenoid to the signal from the detector to determine if the arm is properly positioned.

In some embodiments, the arm is formed to include a push rod which acts on the storage container as the arm is moved to the second position to cause the storage container to be moved in the storage space such that a portion of the storage container extends outwardly from the storage space.

In some embodiments, the storage container is operates as a light pipe and the actuation assembly is operable to illuminate the storage container when the storage container is released from the storage space, or specific information needs to be conveyed by illumination color or illumination characteristic such as fast blink, slow blink, color sequencing etc.

In some embodiments, the override release mechanism includes a security device to prevent the override release mechanism from being actuated.

In some embodiments, the security device is a lock that is only moveable by operation of a key.

In some embodiments, the storage container conducts light and the actuation assembly is operable to illuminate the storage container when the storage container is released from the storage space.

In some embodiments, the override release mechanism includes a security device to prevent the override release mechanism from being actuated.

According to a second aspect of the present disclosure, a storage device for medical products comprises a control system, a cabinet, a drawer assembly positioned in the cabinet, the drawer assembly including a plurality of storage spaces, a plurality of storage containers, each storage container associated with one of the storage spaces, an actuation assembly including an array of actuators, each of the actuators of the array being associated with a respective storage container, each of the actuators being independently actuable to secure or release the respective storage container with which the respective actuator is associated relative to the storage space, and a manual release mechanism actuable by a user to over-ride the actuation assembly and independently release the storage containers from all, or a predefined subset of, the storage spaces.

In some embodiments, the drawer assembly is removable from the cabinet.

In some embodiments, the drawer assembly is secured to the cabinet by an electrically actuable actuator.

In some embodiments, the manual release mechanism is secured to the drawer assembly, the manual release mechanism including a user interface that is manually operable to move the release mechanism to release the storage containers.

In some embodiments, movement of the override user interface is transferred to cause longitudinal movement of a rod along a longitudinal axis of the rod.

In some embodiments, longitudinal movement of the rod is transferred to a link to cause rotational movement of a shaft about the longitudinal axis of the shaft.

In some embodiments, rotational movement of the shaft cause a link to engage a portion of the actuation assembly to cause the storage containers to be released independently of the actuators. In some embodiments, the rotating override tabs on the shaft include or consist of spring steel features allowing for rotational overtravel to occur ensuring complete actuation of each release mechanism, thus accounting for potential manufacturing variations.

In some embodiments, the storage containers are configured to permit air to flow through the container, without permitting a user to access the contents of the storage container.

In some embodiments, the storage container includes a guard that comprises a number of vanes, the vanes spaced apart to allow air to flow through the guard and into a storage space of the storage container.

In some embodiments, the storage container includes a lower support surface, the lower support surface including at least one fenestration to both permit air to flow through the lower support surface into the storage space, and further provide a means of protection against diversion tools being slid under the storage tray.

In some embodiments, the control system is operable to monitor the storage conditions of an inventory item stored in the device and to determine if the inventory has been compromised.

In some embodiments, the storage device includes sensors to monitor environmental conditions and the control system utilizes sensor data to determine if the inventory has been compromised.

In some embodiments, the control system monitors to determine if a particular inventory item has been absent from a storage location to determine if a particular inventory item has been compromised.

In some embodiments, if an inventory item has been compromised, the control system may change the status of the stored inventory to a quarantine status. In some embodiments, the control system is operable to report the quarantine status to an appropriate supervisory authority.

In some embodiments, the storage device is operable to illuminate a storage container in a particular color that corresponds to the type of inventory or status of the inventory stored in the storage container.

According to a third aspect of the present disclosure, \a storage device for medical products comprises a cabinet, a drawer assembly, a plurality of storage containers, an actuation assembly and a manual release mechanism. The drawer assembly is positioned in the cabinet and includes a plurality of storage spaces. Each storage container associated with one of the storage spaces. The actuation assembly includes an array of actuators, each of the actuators of the array being associated with a respective storage container and being independently actuable to secure or release the respective storage container with which the respective actuator is associated relative to the storage space. The manual release mechanism actuable by a user to over-ride the actuation assembly and independently release the storage containers from the storage spaces.

In some embodiments, the storage device comprises a plurality of drawer assemblies, each drawer assembly including a plurality of storage spaces, each drawer further comprising a separate manual release mechanism to release only the storage containers or the respective drawer.

In some embodiments, each manual release mechanism is spring biased to a position that prevents the storage containers of the drawer from being manually released.

In some embodiments, the manual release may be manual moved to a released position and locked in the released position.

In some embodiments, each manual release includes a handle that is normally inaccessible to a user.

In some embodiments, the handles are positioned behind a cover that is secured to the cabinet by a lock that requires a security interface to be actuated to release the lock.

In some embodiments, the manual release mechanism is spring biased to a position that prevents the storage containers of the drawer from being manually released.

In some embodiments, the manual release may be manual moved to a released position and locked in the released position.

In some embodiments, each manual release includes a handle that is normally inaccessible to a user. In some embodiments, the handle is positioned behind a cover that is secured to the cabinet by a lock that requires a security interface to be actuated to release the lock.

In some embodiments, the cabinet includes a catch and the lock includes an actuator that moves into engagement with the catch when the lock is moved to a locked position.

In some embodiments, the cabinet includes a diversion resistant feature that is configured to prevent illicit access to an actuator to circumvent the actuation assembly.

In some embodiments, the diversion resistant feature is integrated into the storage container. In some embodiments, the diversion resistant feature is barrier formed on a portion of the storage container. In some embodiments, the storage container includes a retainer configured to be engaged by latch that is moved by an actuator to secure the storage container, the barrier comprising a wing formed adjacent the retainer. In some embodiments, the storage container includes a retainer configured to be engaged by latch that is moved by an actuator to secure the storage container, the barrier comprising a plurality of ribs formed on the bottom of the storage container. In some embodiments, the storage container includes a retainer configured to be engaged by latch that is moved by an actuator to secure the storage container, the barrier comprising a latch block formed on the storage container. In some embodiments, the storage container includes a retainer configured to be engaged by latch that is moved by an actuator to secure the storage container, the barrier comprising a rib formed on a cap of the container. Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 2:
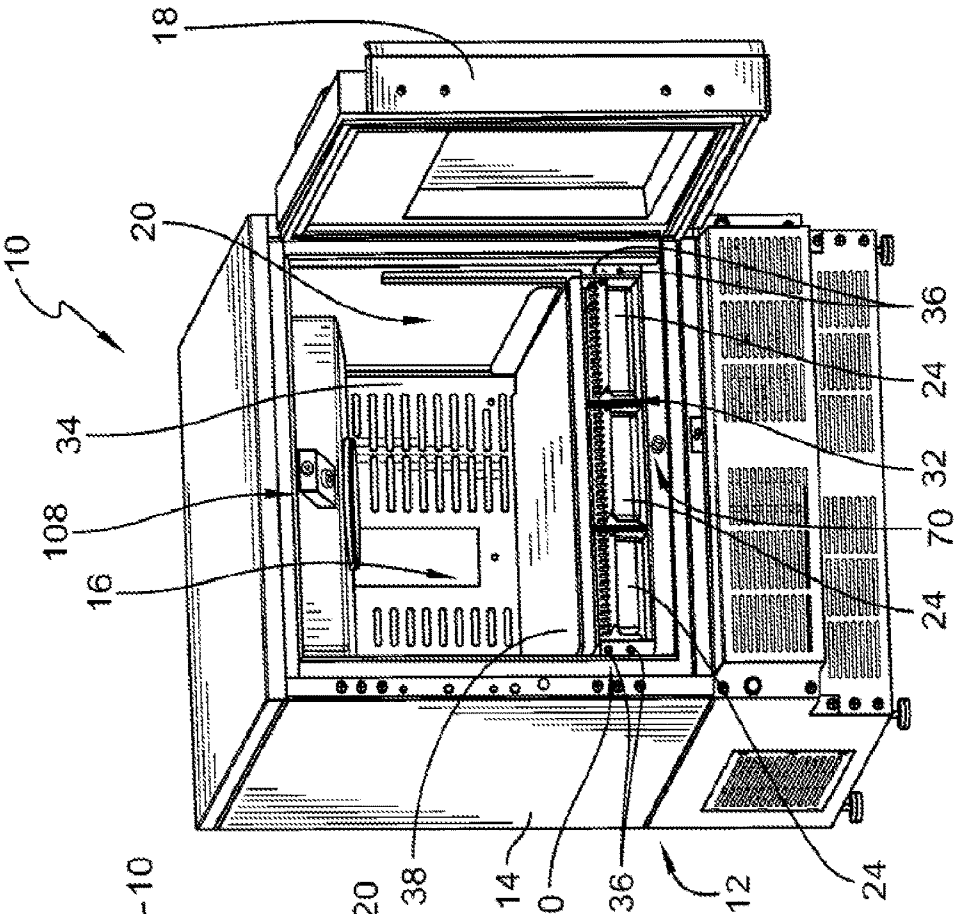
FIG. 2 is a perspective view of the storage device of FIG. 1 with the door opened to show that the storage space includes a number of drawers that are accessible through the activation of an access control system.
Figure 1:
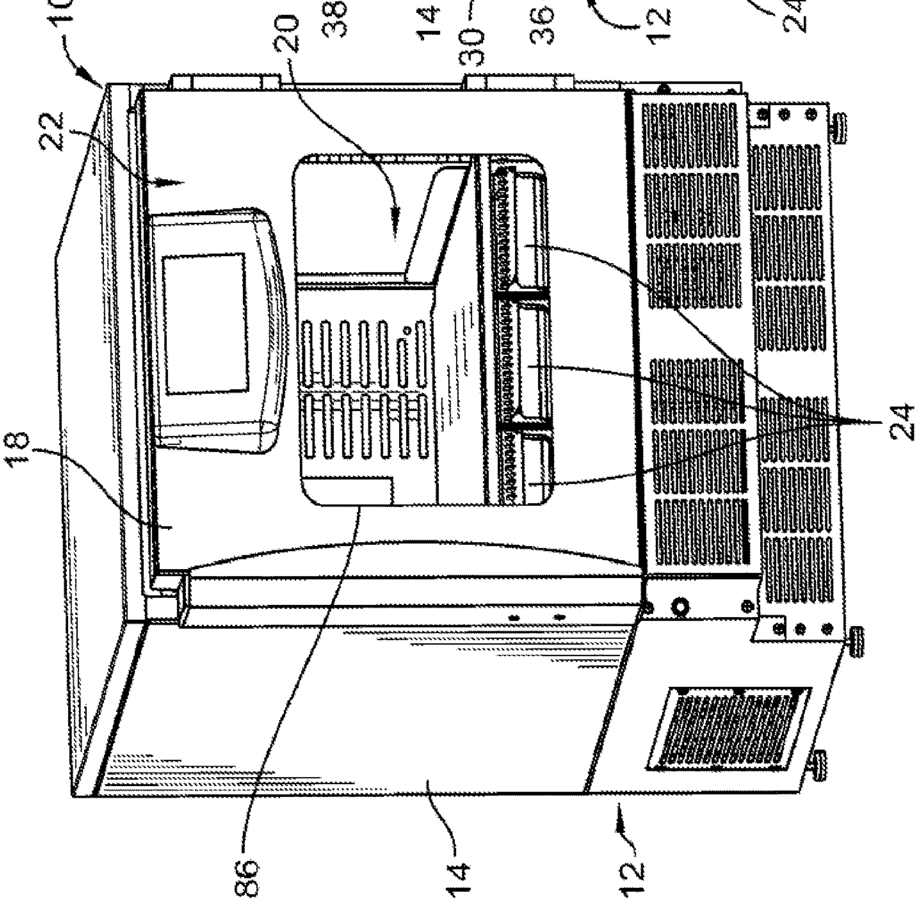
FIG. 1 is a perspective view of a temperature controlled storage device that has a door, shown in a closed position, that is openable to allow access to a storage space in the storage device.

A climate-controlled medical products storage device 10, illustratively embodied as a refrigerator is shown in FIG. 1. The refrigerator 10 includes a cabinet 12 having a cabinet body 14 forming an enclosure 16 (seen in FIG. 2) and a door 18 which is movable between an open position shown in FIG. 2 and a closed position as shown in FIG. 1. Referring now to FIG. 2, the enclosure defines a storage space 20 having a drawer 30 which defines a compartment 32. The door 18 includes a window 86 which allows a user to view the materials stored in the storage space 20. In the illustrative embodiment, the window 86 is transparent. In other embodiments, the window may be embodied as a window having variable opacity as disclosed in U.S. Pat. No. 9,574,817 which is incorporated by reference herein for the disclosure of a structure that causes variations in the opacity of a window of medical products storage device. Such variable opacity can be configured based on access authority of a user—it may become transparent for approved access, remain transparent for a high access authority user, or become/remain opaque at other times hide the actual contents of the refrigerator from those contemplating diversion. The drawer (aka module) 30 is configured to receive and support three storage containers embodied as a storage trays 24. As will be described in further detail below, each storage tray 24 is configured to be retained within a compartment 32 within drawer 30 and inaccessible to a user under normal operating conditions.

Figure 3:
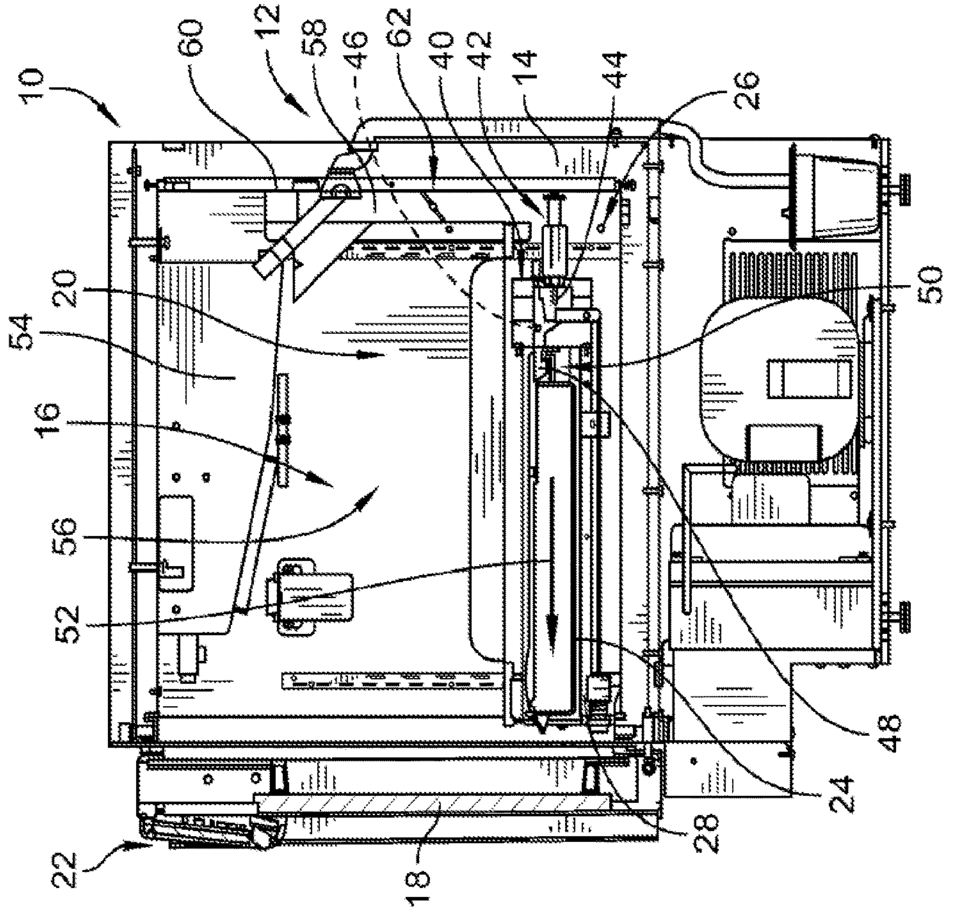
FIG. 3 is a cross-sectional side view of the storage device of FIG. 1 with a latch member in a locked position to hold a storage drawer in a retained position preventing the contents of the drawer from being accessed.
Figure 6:
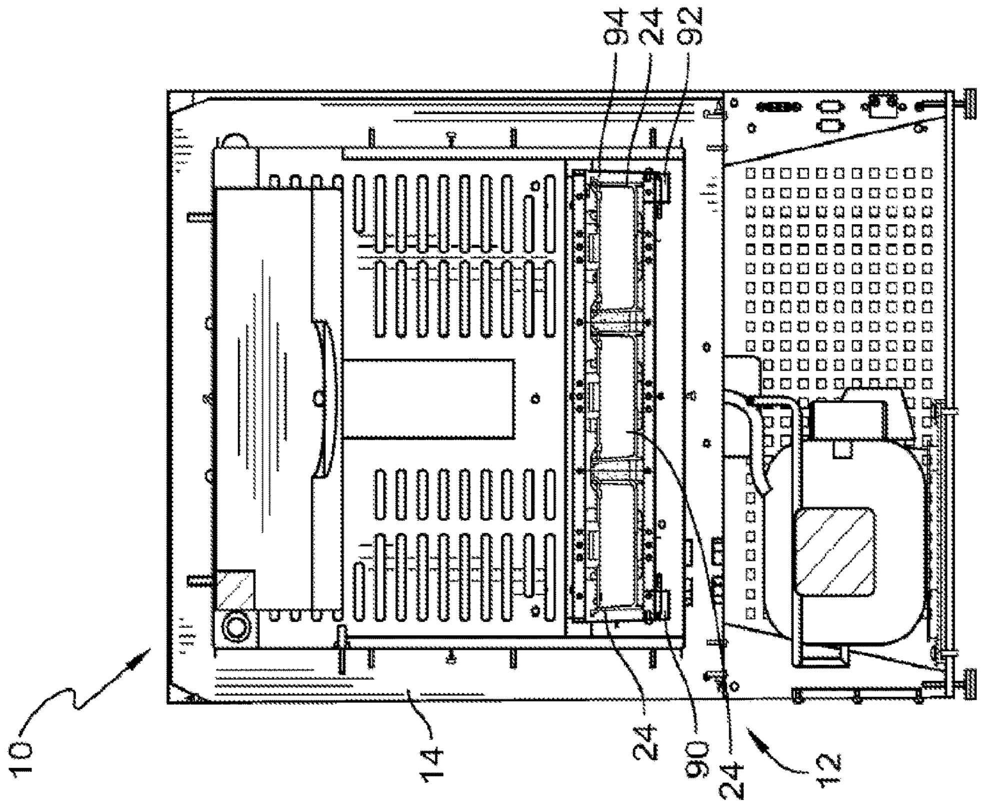
FIG. 6 is a cross-sectional back view of the storage device of FIG. 1, FIG. 6 showing a pair of solenoids used to secure a drawer assembly of the storage device of FIG. 1 in the enclosure of the storage device.

Referring now to FIG. 3, control of access to the contents of the storage trays 24 is facilitated by an actuation system 26 to control access to the different storage trays 24 each positioned in a compartment 32. Referring again now to FIG. 1, the cabinet 12 further includes a controller box/user interface 22 supported on the cabinet body 14. The controller box 22 encloses a portion of a control system. The control system operates similarly to the control system of U.S. Pat. No. 9,579,245, titled "Medical Products Storage Device Including Access Control," issued Feb. 28, 2017, which is incorporated by reference herein for the disclosure of the control system for controlling the environment in the enclosure 16 and access to storage trays 24. However, in the present disclosure, the actuation system 26 is configured for application to a limited number of storage trays 24 positioned in compartments 32 within drawers 30. The storage device 10 of the present disclosure operates a dual purpose temperature controlled storage system for general purpose storage and high value products storage. In addition to the disclosure of the light pipe capability of the trays disclosed in the '245 patent, the device 10 may be configured with LEDs of varying colors that cause the trays 24 to be illuminated. The various colors may be illuminated continuously to permit a user to more quickly identify the type of medication or medical product stored in the particular tray 24 with a color code or illumination characteristic such as fast blink, slow blink, color sequencing etc.

In some embodiments, the control system may be operable to perform a two-factor authentication such as detecting the presence of a radio frequency ID (RFID) badge and sensing a biometric characteristic of the user, such as a voice detection, face detection, retinal scan, or fingerprint, to confirm that the authorized user that is presented by the RFID tag is the actual user. In other embodiments, the control system may be in communication with a remote authorizing entity such as a central pharmacy or particular pharmacist, such that when a user attempts to access a restricted location or tray 24, the authorizing entity is one of a dual authorization, or required to make a final authorization of the access by the user. This may include two-way communication between the user and an individual at the authorizing entity, or it may include the use of a camera 108 (seen in FIG. 2) to transmit the image of the individual attempting to access the location to the authorizing entity such that the authorizing entity may make the final determination that access is appropriate. The camera 108 may also provide a video feed that is recorded to provide a history of any attempts to access the space 32.

The drawer 30 is positioned in the bottom of the enclosure 16 and configured to engage a back wall 34 of the enclosure 16. The drawer 30 is retained in the enclosure by security screws 36 so that the drawer 30 is fixed within the enclosure 16 and not removable without the use of tools. Multiple drawers 30 may be stacked upon each other to increase the number of storage trays 24 available within an enclosure 16. A top surface 38 of the top drawer 30 may be used to support materials being stored within the device 10. It is also understood that different height drawers 30 and corresponding different height storage trays 24 can be used or combined.

Figure 4:
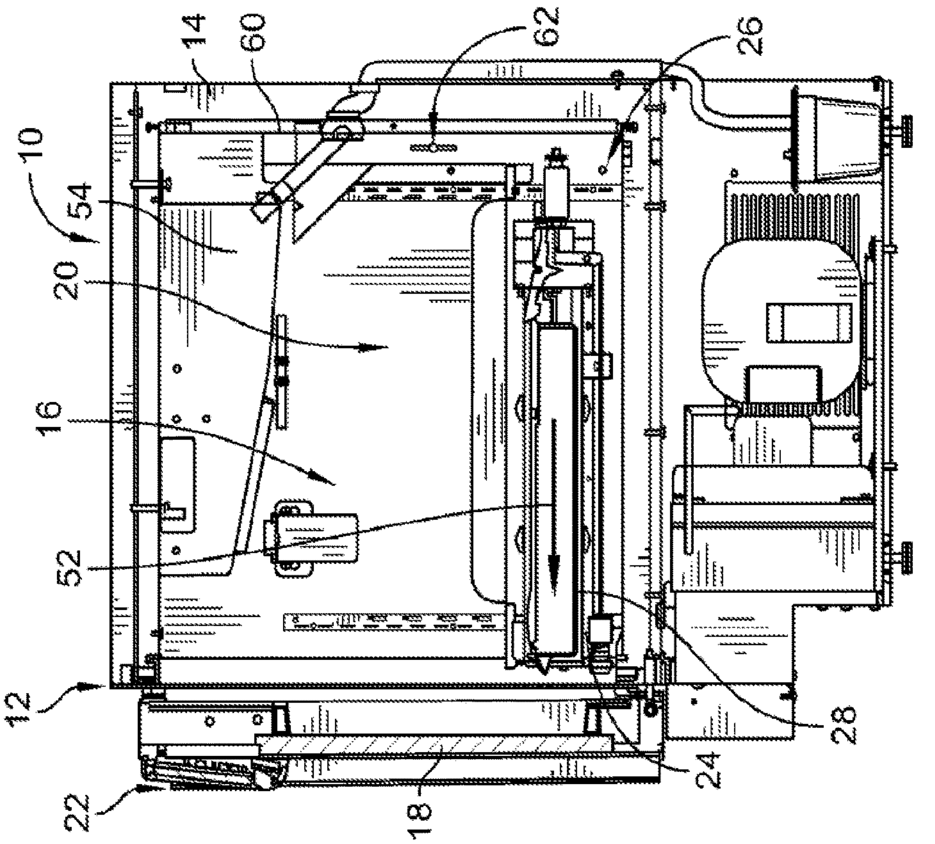
FIG. 4 is a cross-sectional view similar to FIG. 3, FIG. 4 showing the latch member moved to a released position by an electrical actuator to permit the drawer to be removed and accessed.

Referring now to FIG. 3, in a cross-sectional side view it is clear that each of the storage trays 24 are positioned in the drawer 30 on a surface 28 of the drawer 30 and engageable with a respective arm or latch 40 that is configured to retain the particular storage tray 24 within the drawer 30. The latch 40 is part of the actuation system 26 and functions similarly to the latch approach used in the '245 patent discussed above. However, in the embodiment of the present disclosure, the latch is actuated by a solenoid 42 which has a plunger 44. The plunger 44 is movable between the retracted position of FIG. 3 and an extended position as shown in FIG. 4 to cause the latch 40 to pivot about an axis 46 to disengage a hook 48 of the latch 40 from a retainer 50 formed in the tray 24. Disengagement of the hook 48 from retainer 50 permits the storage tray 24 to be slid in the direction of arrow 52 to permit respective tray 24 to be accessed or removed from the drawer 30. In some embodiments, the actuation system 26 may, like the disclosure of the '245 patent, include a detector (not shown) to detect an arm of the latch 40 to determine if the latch 40 is an expected decision. In some embodiments, a load sensor (not shown) may be positioned on the surface 28 and interposed between a tray 24 and the surface 28. A single load sensor may cover the surface 28 and engage with the multiple trays 24. In other embodiments, an individual load sensor may be positioned between each respective tray 24 and the surface 28. When present, the load sensor(s) is/are operable to detect the presence of a tray 24, or in some embodiments, the load sensor is able to determine a weight of the tray 24 and any contents in the particular tray 24. This information is provided to the control system and used by the control system to determine if an appropriate load is present either before or after a user has accessed the particular tray 24. For example, the load sensor may provide information to the control system that is used by the control system to determine that the amount of material removed from the tray 24 exceeds the amount a user has received authorization to remove. This information may then be used to identify a potential diversion of a material in the tray 24. The load sensor may comprise a piezoelectric sensor, load beam, force sensing resistor, or other suitable sensor capable of detecting a load. In other embodiments, an individual near field communication (NFC) transceiver may be positioned (not shown) between each respective tray 24 and the surface 28. When present, the NFC sensor is operable to detect the presence and unique ID tag of a tray 24 (potentially embedded within the molded plastic of tray 24), and further the actual tagged contents in the tray 24. The NFC embodiment is well suited for use within each compartment 32 having metallic walls between adjacent (above, below, aside) trays 24.

Figure 8:
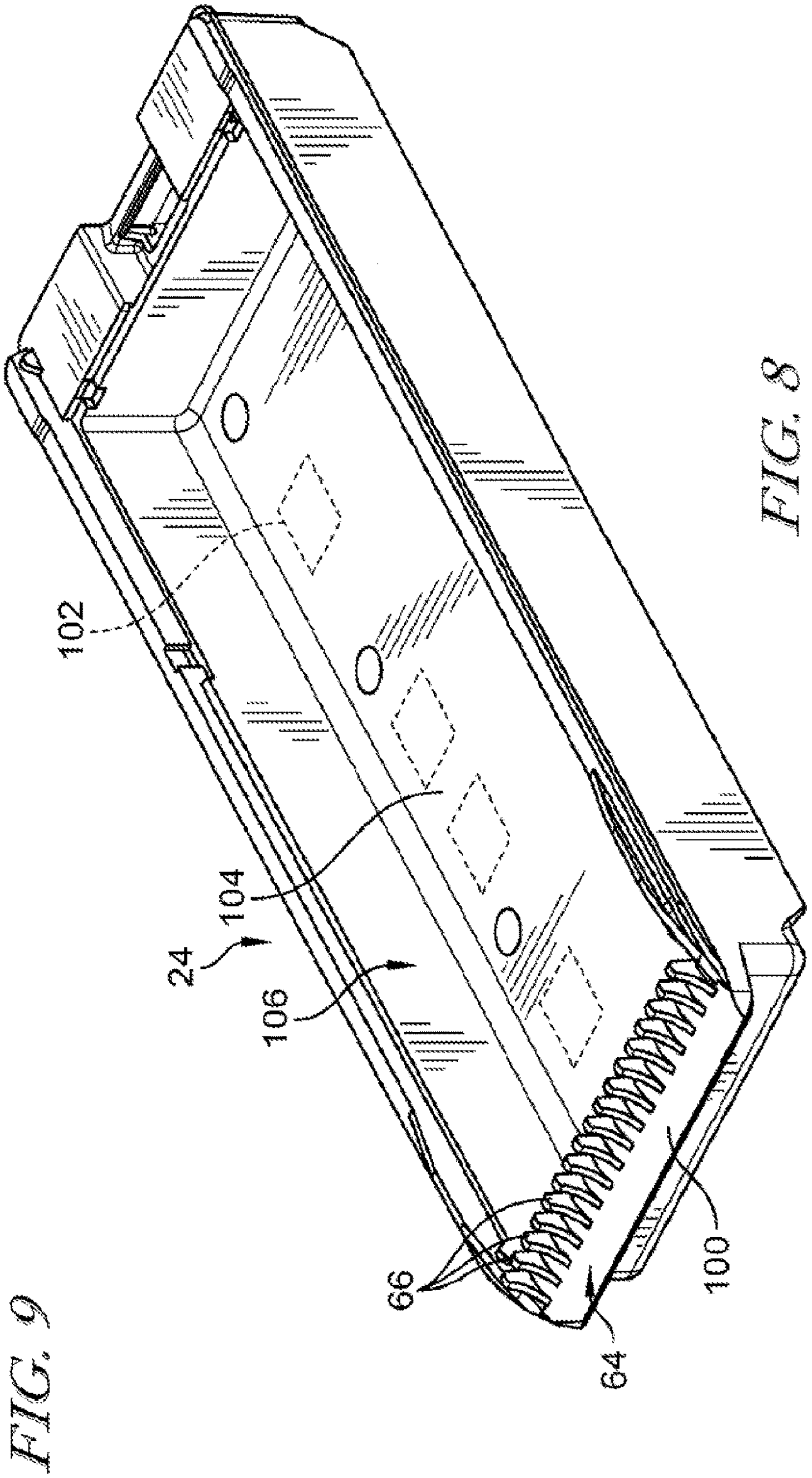
FIG. 8 is a perspective view of a tray of the storage device of FIG. 1.
Figure 9:
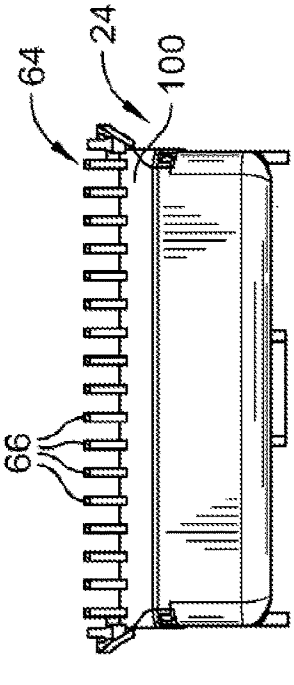
FIG. 9 is a front view of the tray of FIG. 8.

Referring to FIGS. 8 and 9, the trays 24 are each configured to permit visualization of the contents and air flow into and through the tray 24. The trays 24 include a guard 64 that includes a number of vanes/fins 66 that extend upwardly from a grip 100 of the tray 24. In some embodiments, a tray 24 may include fenestrations or though-holes 102 (shown in phantom in FIG. 8) formed in a lower surface 104 of the tray 24 to allow air to flow from the underside of the tray 24 into and through a storage space 106.

The access control to the trays 24 is provided through the user interface 22 in a manner similar to that described in the '245 patent discussed above. In the illustrative embodiment disclosed herein, the door 18 is lockable with a magnetic lock (not shown) to provide a first level of access control into the storage space 20. Thus, when materials that are subject to access control, but require limited access control need to be stored, a first level of access control can be provided by the door 18 which permits a user to access materials in the enclosure 16, but not in storage trays 24. For higher value items that require a second level of access control, a user may be permitted access to a specific storage tray 24 through a user interface 22, or externally by means of ethernet or wireless based application program interface (API) commands such that the control system controls access to a specific storage tray 24 through the actuation system 26.

In the illustrative embodiment of FIG. 3, air within the enclosure 16 is circulated by a thermal control fan assembly 54 (shown in FIG. 3) to cause mixing of the air in a portion 56 of the storage space 20. The flow of air into the compartment 32 of the drawer 30 is limited to a flow path 58 from the portion 56 into the area of the compartment 32 for each included/attached drawer 30. A HEPA or HEPA/Organic reduction filter 60 is positioned at the opening of the flow path 58 and operable to treat the air flowing from the portion 56 into the flow path 58 to reduce the potential for contamination into compartment 32. The filter 60 may include active charcoal to remove organics from air passing through the filter 60. A damper 62, under the control of the control system is operable to open and close to vary the flow of air from the main portion 56 into the compartment 32 and storage space 20. The damper 62 is moved by a damper motor (not shown) in response to signals received from sensors (not shown) positioned in the compartment 32. In the illustrative embodiment, the sensors are temperature sensors, but in other embodiments the sensors may include humidity sensors, flow sensors, or other appropriate environmental sensors that provide feedback to the control system to control the environment of the compartment 32. The damper 62 is movable between a fully closed position shown in FIG. 3 and a fully open position shown in FIG. 4. In some embodiments, the filter 60 and damper 62 may be omitted allowing compartment 32 to interact with the remainder of the storage space 20 is subject to the same environmental conditions as storage space 20.

Figure 5:
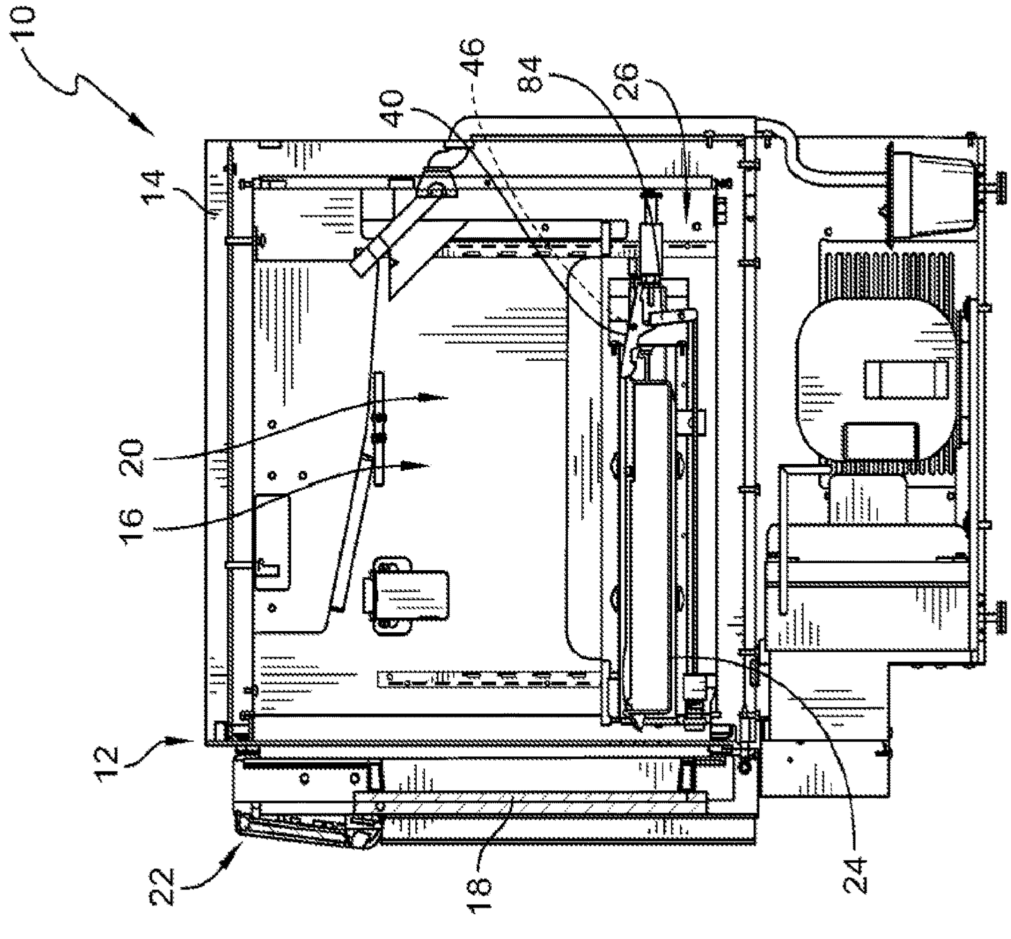
FIG. 5 is a cross-sectional view similar to FIG. 3, FIG. 5 showing the latch member moved to a released position by a manual override to permit the drawer to be removed and accessed.
Figure 7:
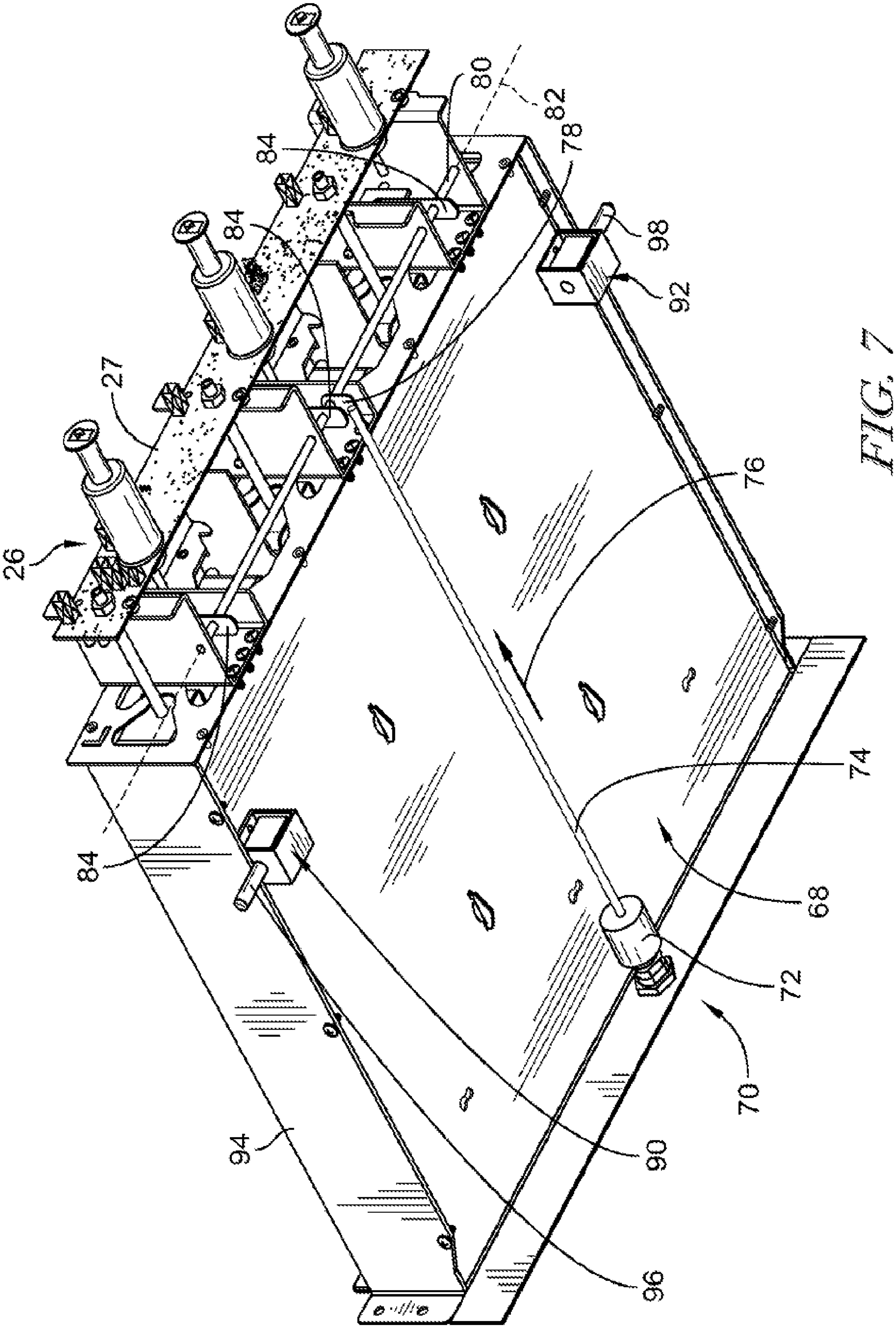
FIG. 7 is a perspective view of a drawer assembly of the storage device of FIG. 1.

Referring now to FIG. 5, because the actuation system 26 is electrically operated, the device 10 is configured to permit manual override of the latches 40 so that the storage trays 24 may be removed when electrical power to the device 10 is lost. Referring now to FIG. 7, an override mechanism 68 includes a key actuated user interface 70 that is accessible when the door 18 is open as illustrated in FIG. 2. When a key is inserted into the user interface 70 and rotated, the rotational motion is transferred by a cylinder 72 to cause longitudinal movement of a rod 74 in the direction of an arrow 76. That longitudinal motion is transferred from rod 74 to link 78 which causes a shaft 80 to rotate about its longitudinal axis 82. Multiple links 84 are fixed to the shaft 80 and move with the shaft 80 to engage respective latches 40 as shown in FIG. 5. Thus, the override mechanism 68 is operable to move the links 84 from the position shown in FIG. 3 to the position shown in FIG. 5. As shown FIG. 5, the action of override mechanism 68 causes the latch 40 to rotate about the axis 46 such that the hook 48 disengages a retainer 50. This allows the user to remove the respective storage trays 24 even when power is not available to the device 10.

To prevent unauthorized removal of the drawer 30, a pair of solenoids 90, 92 are mounted to the bottom of a frame 94 of drawer 30. The solenoids 90, 92 include respective actuators 96, 98 which are normally extended to engage apertures in the enclosure 16 to secure the drawer 30 to the enclosure 16. The solenoids 90, 92 may be energized to disengage the actuators 96, 98 from the enclosure 16 to permit removal of the drawer 30 from the enclosure 16. Thus, a user must remove the screws 36 and actuate the solenoids 90, 92 to free the drawer 30 from the enclosure 16.

In some embodiments, the device 10 may include a radio frequency (RFID) monitoring system similar to that disclosed in U.S. Pat Publication No. 20110202170, titled "Access and Inventory Control for Climate Controlled Storage," and published Aug. 18, 2011, which is incorporated by reference herein for the disclosure of the inventory monitoring system, including the monitoring of storage conditions and indication of the improper storage of materials. The information regarding improper storage may be provided externally from the device 10 to a centralized monitoring system. The use of the RFID monitoring system may coordinate with sensors in the device 10 to monitor temperature, humidity, airflow through the filter 60, and time that a particular material has been absent from the storage location, also known as an excursion. The control system is operable to monitor all of the storage and excursion factors to determine if a particular inventory item has been compromised. If the inventory has been compromised, the control system may change the status of the stored inventory to a quarantine status and report the status to an appropriate supervisory authority, such as a central pharmacy unit or particular pharmacist.

Figure 10:
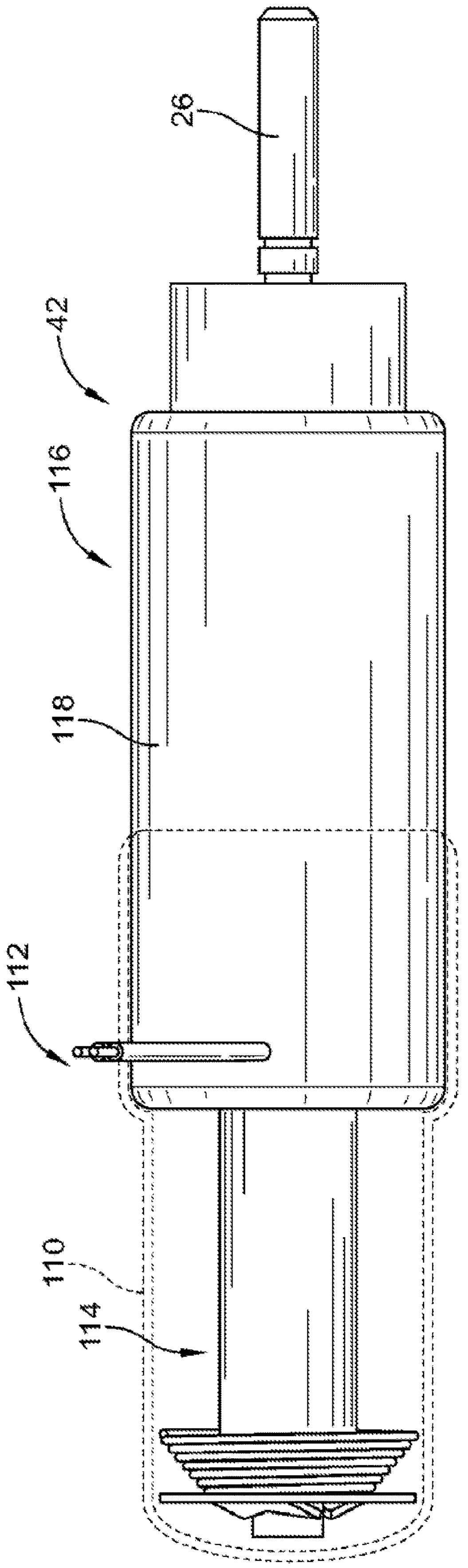
FIG. 10 is a plan view of a solenoid of the present disclosure, the solenoid shown with an optional cover that provides electrical insulation protection as well as reducing the potential for tampering with the operation of the solenoid.

Referring now to FIG. 10, an embodiment of a solenoid 40 is shown with an optional cover 110 (shown in phantom) attached to the back side 112 of the solenoid 40. The cover 110 is a thermoformed polymer material that electrically insulates the back arm 114 such that the back arm 114 does not electrically or magnetically engage with any metal portions of the enclosure 16 when the plunger 26 is actuated. The cover 110 engages the surface 118 of a coil housing 116 with an interference fit so that the back arm 114 is retained relative to the coil housing 116. The cover 110 is not shown in other view, but may optionally be included with any of the embodiments disclosed herein. The cover 110 further protects the solenoid 42 from a diversion event of being actuated by direct physical access (via diversion tool such as a bent wire) and moving of the back arm 114.

Figure 17:
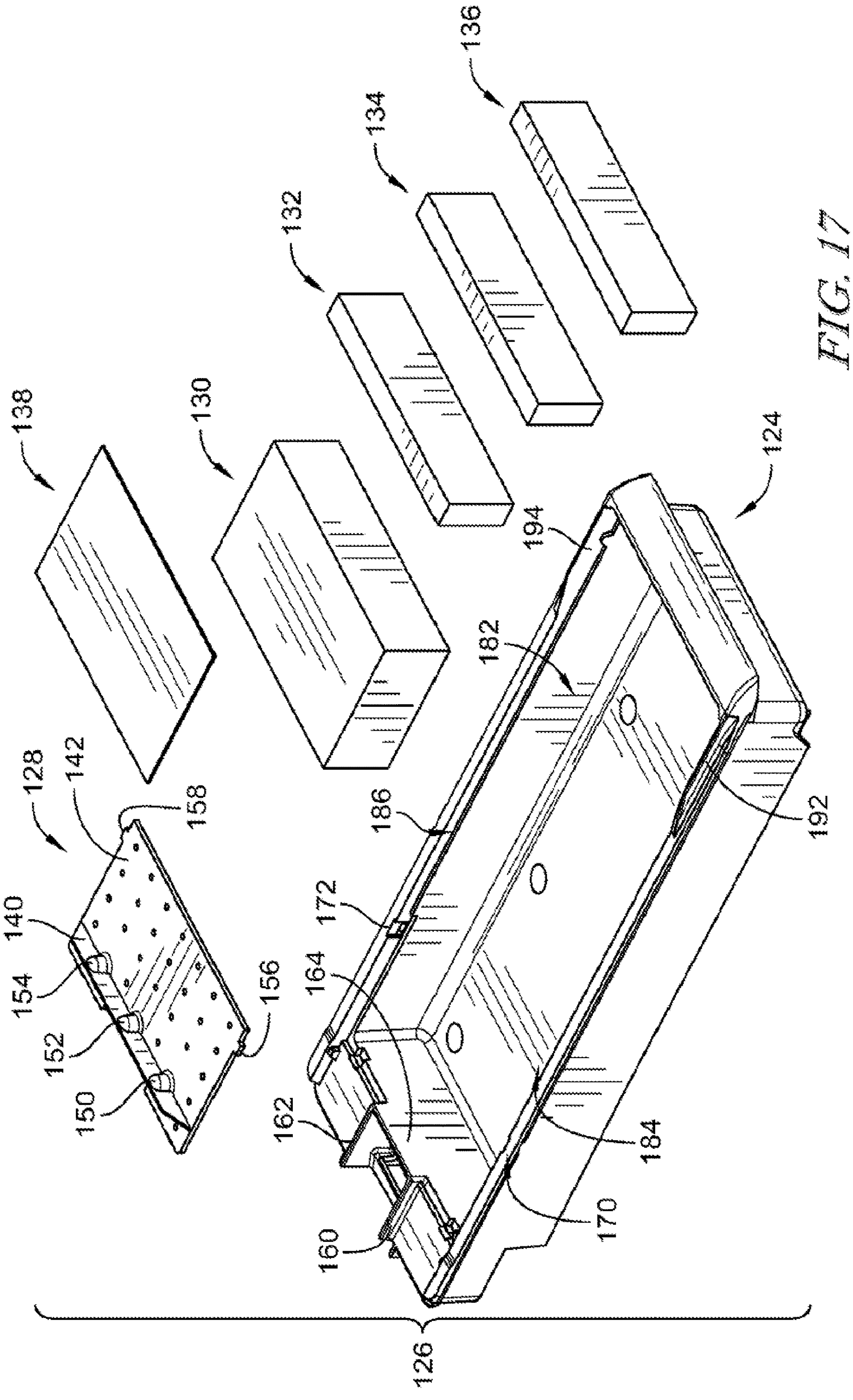
FIG. 17 is an exploded view of the components shown in FIG. 16.

Referring now to FIG. 17, another embodiment of a tray 124 is shown with additional features that may be employed to assist with avoiding diversion of various medical products 130, 132, 134, and 136 that may be stored in the tray 124 in a storage device 10. The tray 124 is part of a tray assembly 126 that includes a cover 128 and a cover 138. The covers 128 and 138 cooperate with the tray 124 to limit access to the medical products 130, 132, 134, and 136 when the tray 124 is positioned in a drawer 30. In addition, there are tamper resistant features of tray 124 that assist in preventing a latch from being illicitly actuated to a released position by some external method, such as using a wire to reach latch 40 or solenoid arm 114.

Figure 16:
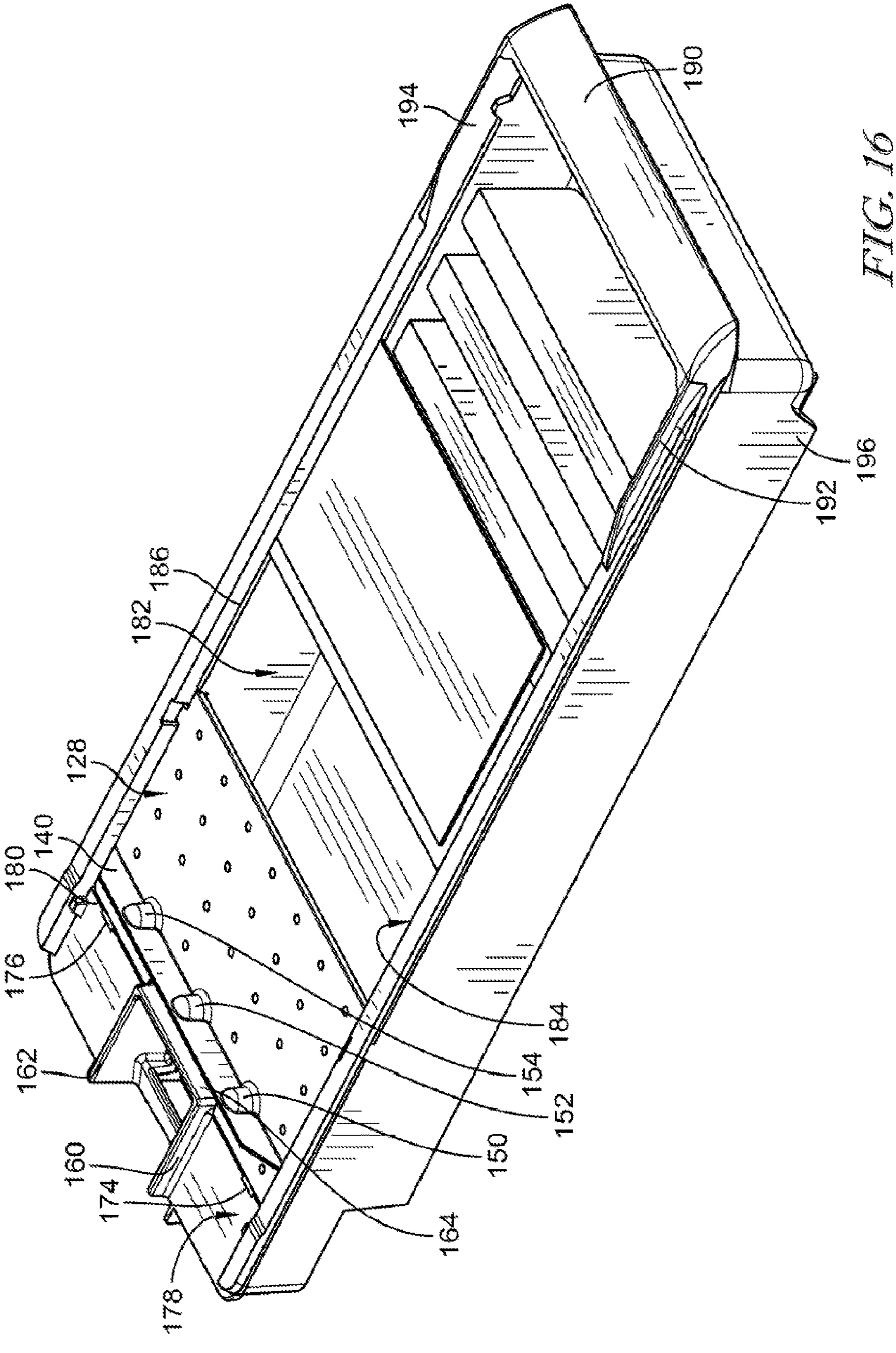
FIG. 16 is a perspective view of the tray of FIGS. 11 and 12; the tray shown in FIG. 16 with medical products stored in a storage space of the tray and two separate covers positioned on the tray.
Figure 21:
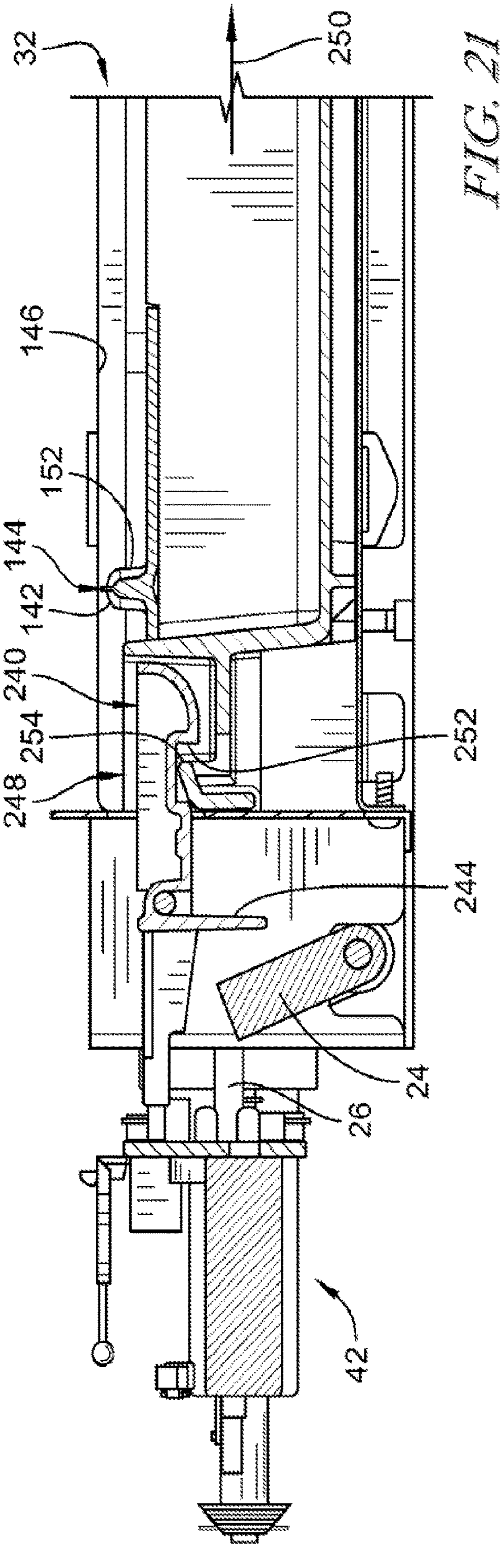
FIG. 21 is a partial cross-sectional view similar to FIG. 11, FIG. 21 enlarged to show additional details.

The cover 128 includes a spacer 140 that extends upwardly from a plate 142 of the cover 138. The spacer 140 extends upwardly when the cover 128 is positioned on the tray 124 as shown in FIG. 21 so that the spacer 140 provides a minimal gap 144 between the spacer 140 and the surface 146 of the top of the compartment 32 in which the tray assembly 126 is positioned. This prevents an individual from surreptitiously using a wire to pass over the cover 128 to reach the latch 140. The spacer 140 extends across the width of the cover 128 to protect against tampering. The spacer 140 is reinforced with three stiffeners 150, 152, 154 that extend up from the plate 142 and provide additional strength for the spacer 140 against any tampering, while also providing resistance to any attempts to deform the cover 128 to dislodge the cover 128. The stiffeners 150, 152 and 154 also extend slightly above spacer 140 and serve to provide a non-binding/scraping contact engagement medium between 128 and the surface 146 of the top of the compartment 32 for when tray assembly 126 is moving within compartment 32. Referring to FIG. 17, the cover 128 further includes two lateral tabs 156, 158 that are positioned on opposite sides of the plate 142 and are configured to be received in recesses 170, 172 formed in the tray 124 in a snap-fit. The tabs 156, 158 cooperate with the two tabs 174, 176 that extend rearwardly from the plate 142 to be received with a snap-fit into recesses 178, 180 formed in the tray 124 as shown in FIG. 16. The snap-fit arrangement securing the cover 128 to the tray 124 provides an additional factor for preventing the cover 128 from becoming dislodged when if a person attempts to tamper with the latch 40.

The tray 124 is also modified as compared to the tray 24 in that the retainer 50 of tray 124 is surrounded by lateral wings 160 and 162 on the lateral sides of the retainer 50. The wings 160, 162 serve to prevent a wire or other illicit device from being inserted into the retainer 50 to dislodge the latch 40 from the sides by guiding the wire around the stiffener 140 of the cover 128. There is an additional wing 164 positioned between the wings 160, 162 and forward of the retainer 50. The wing 164 provides an additional barrier against an illicit device being used to actuate a latch 40 in the retainer 50.

The tray 124 includes a storage space 182 that receives the medical products 130, 132, 134, and 136. The cover 138 is positonable on a pair of ledges 184, 186 that extend along the length of the storage space 182 to overlie the storage space 182 and prevent someone from reaching into the storage space 182 when the tray 124 is locked. It should be understood that a number of covers 138 may be positioned on the ledges 184, 186 and overlie the storage space 182. In addition, a cover may be used that is longer than the illustrative cover 138 and that overlies all of the storages space 182, even overlying the plate 142 of the cover 128. In other embodiment, cover 138 may be omitted and tray 124 may be modified to include one or more hinged covers that are pivotable relative to the tray 124. The storage space 182 may also include dividers that are used to divide the storage space 182 into smaller sections, each with an individual cover.

Figure 11:
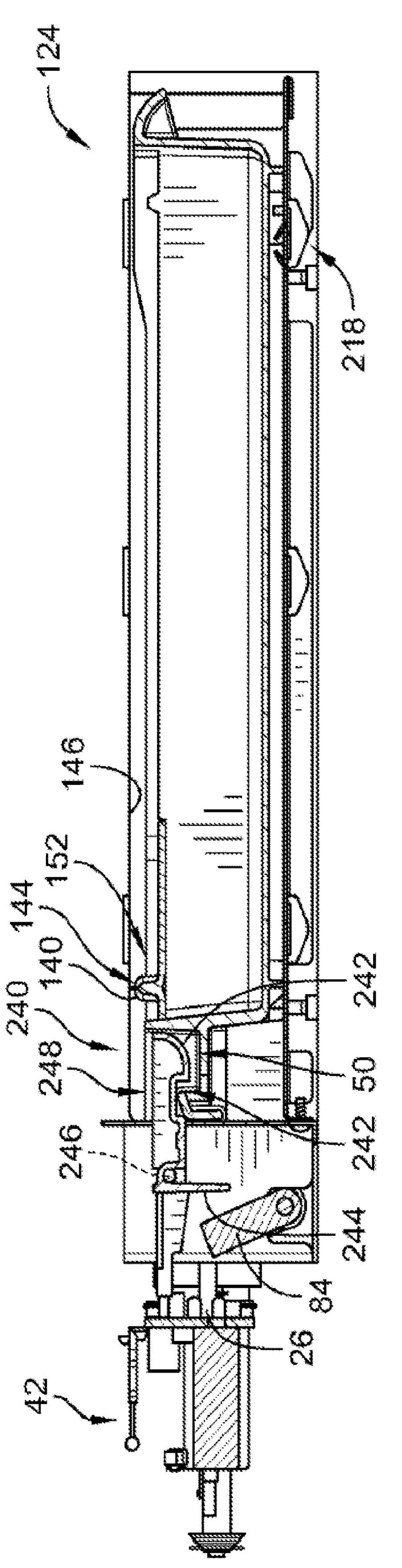
FIG. 11 is a cross-sectional side view of another embodiment of a tray and latch, the tray shown in a fully stored position with the latch engaged with a retainer of the tray.
Figure 12:
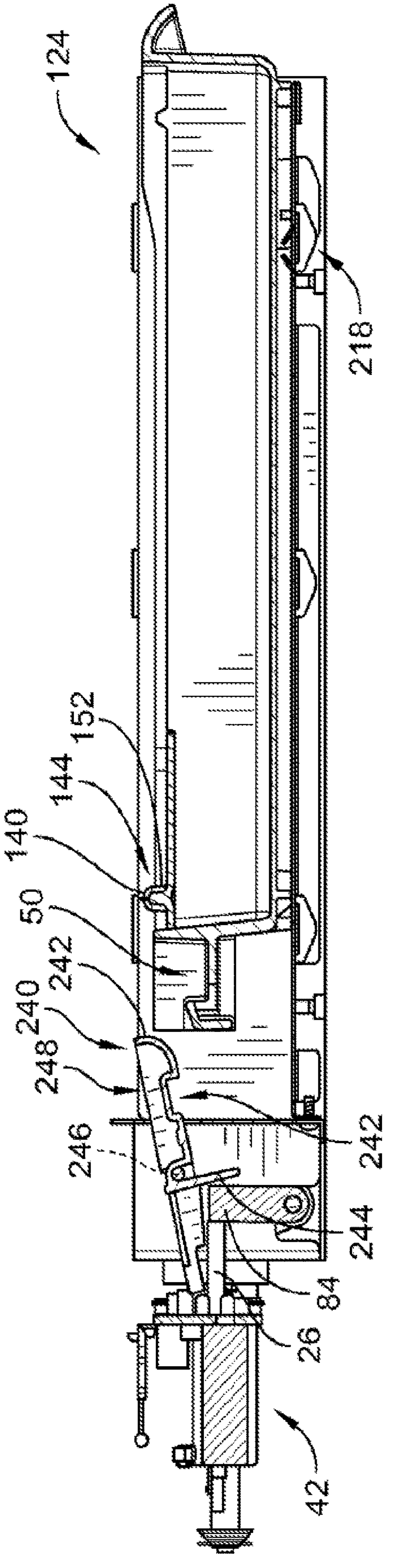
FIG. 12 is a view similar to FIG. 11, the latch being released in FIG. 12 and the tray being moved away from the latch.

The tray 124 includes a grip 190 that extends upwardly to be approximately the same height as the spacer 140, when the spacer 140 is present. The grip 190 is engaged by two wings 192, 194 on the lateral sides of the grip 190 that extend rearwardly toward the retainer 50. The wings 192, 194 are also approximately the same height as the spacer 140 as shown in FIGS. 11 and 12. The height of wings 192, 194, and grip 190 reduce the clearance between the tray 124 and the surfaces of the compartment 32 to prevent the tray 124 from being manipulated in an attempt to illicitly dislodge the latch 40.

Figure 26:
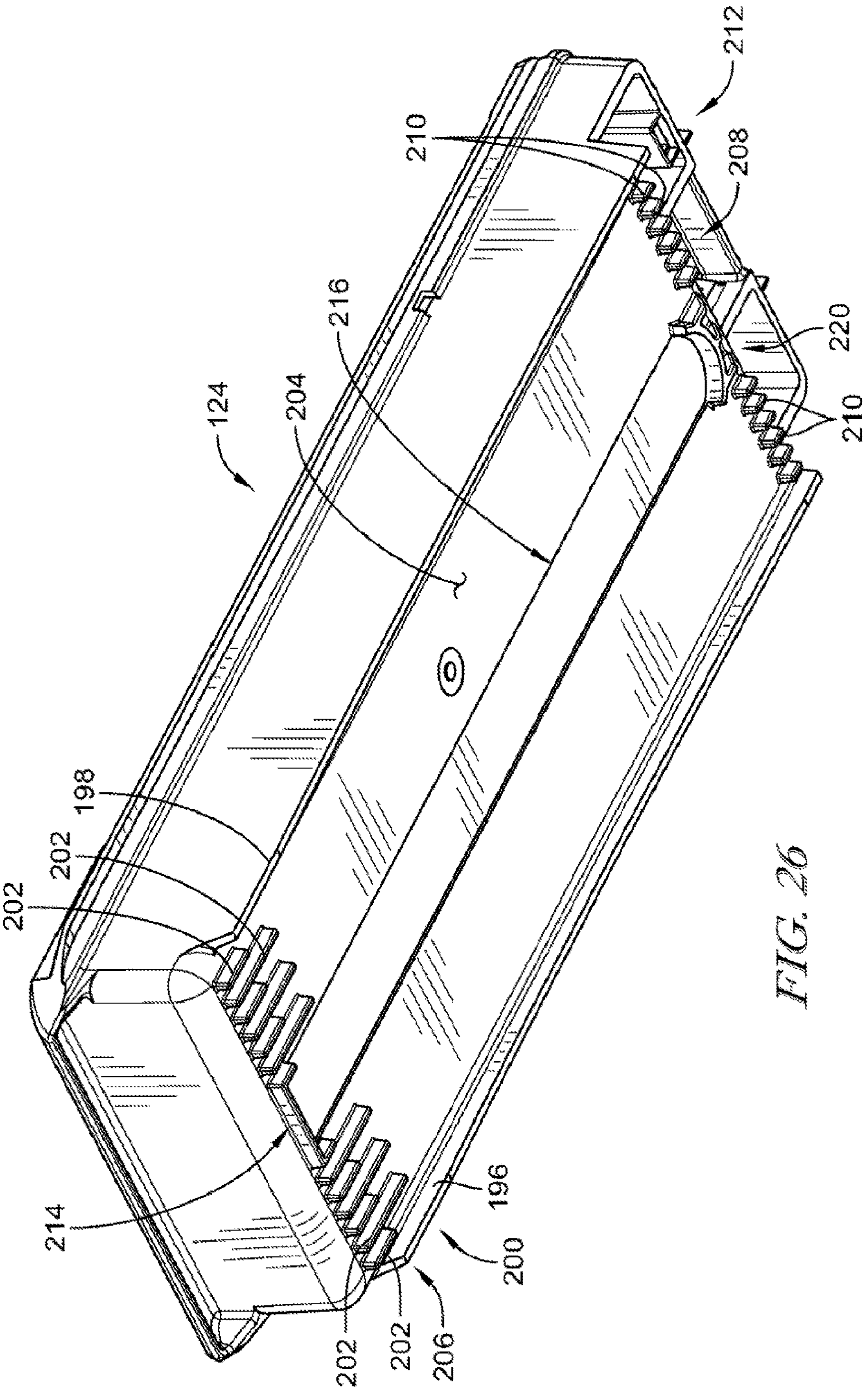
FIG. 26 is a bottom perspective view of the tray of FIGS. 11-15.

Referring now to FIG. 26, the tray 124 further includes two side wings 196, 198 that extend downwardly from the lateral sides of the tray 124 to define a height of the tray 124 along the length of the tray 124. A group 200 of ribs 202 are formed from a lower surface 204 of the tray 124 at the front end 206 of the tray 124. An additional group 208 of ribs 210 are formed near a back end 212 of the tray 124 with the ribs 202 and 210 and the side wings 196, 198 all extending downwardly to support the tray 124 in the compartment 32. Notably, the ribs 202, 210 and wings 196, 198 provide additional spacing to prevent the tray 124 from being jostled or dislodged from the latch 40. The ribs 202 and 210 also tend to reduce the potential of an individual from guiding a wire or other device under the tray 124 to dislodge the latch 40. In addition, a barrier 214 is positioned near the front end 206 to provide additional support.

Figure 13:
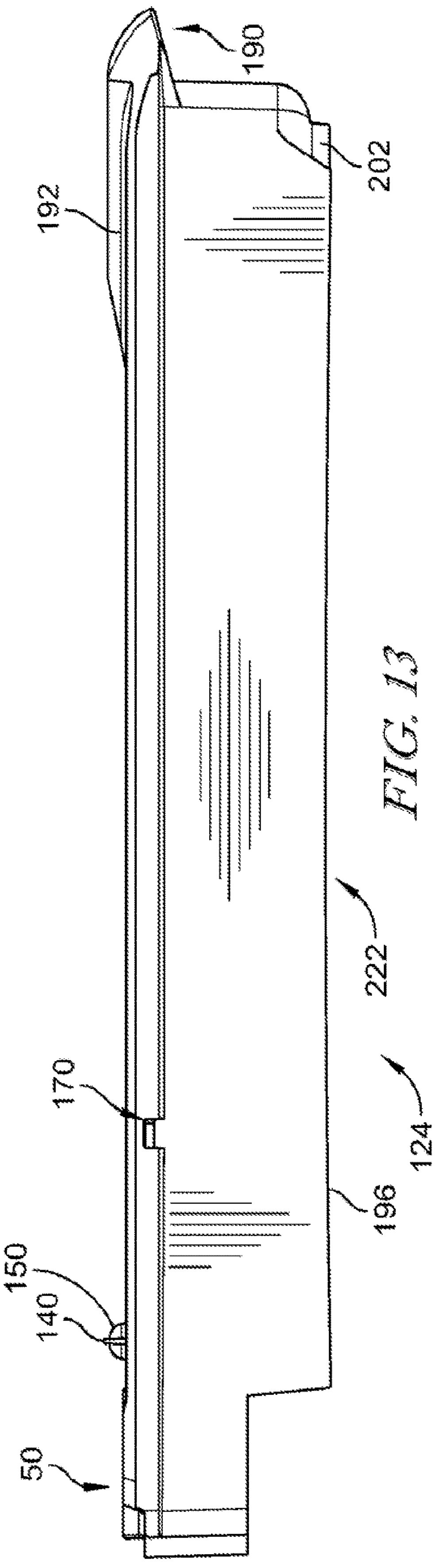
FIG. 13 is a left side plan view of the tray of FIGS. 11 and 12.
Figure 14:
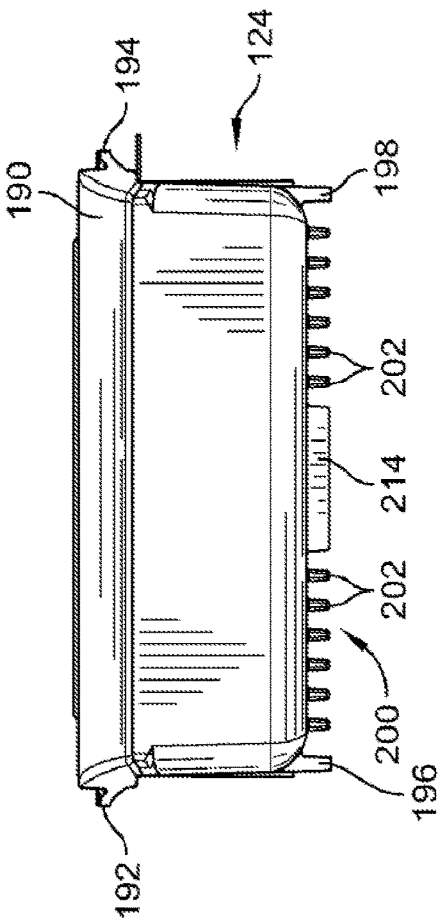
FIG. 14 is a front plan view of the tray of FIGS. 11 and 12.
Figure 15:
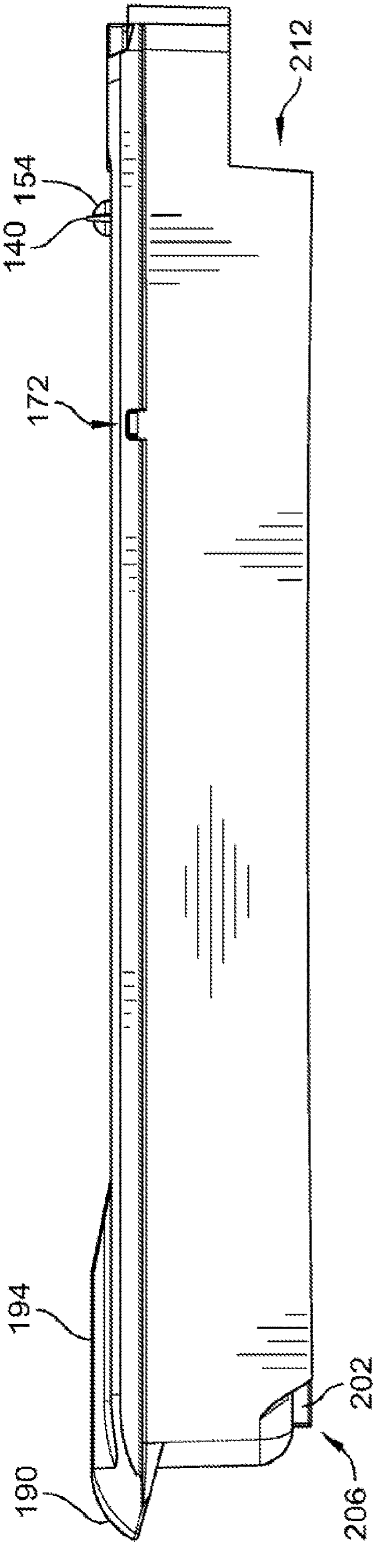
FIG. 15 is a right side plan view of the tray of FIGS. 11 and 12.
Figure 24:
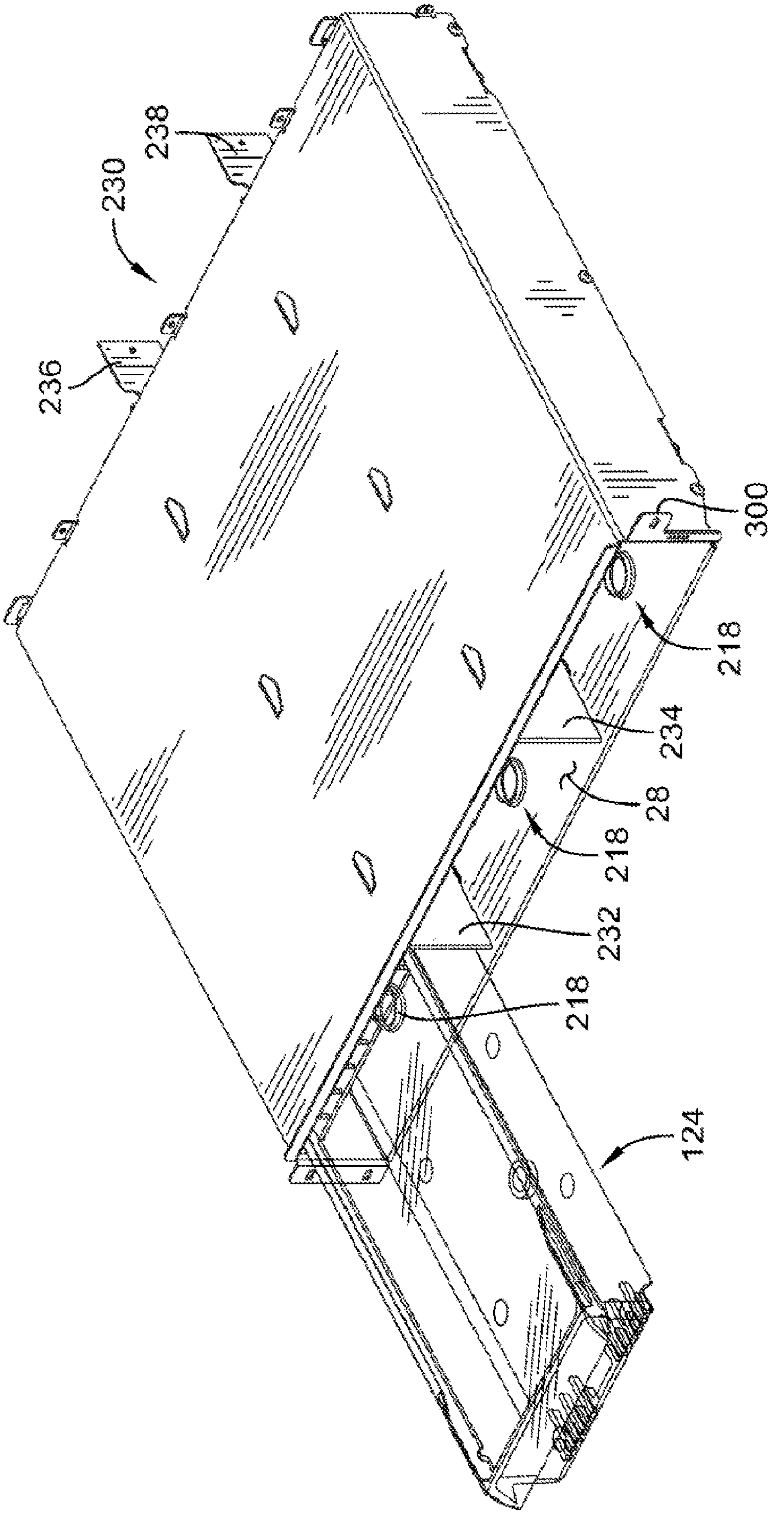
FIG. 24 is a perspective view of an alternative embodiment of a drawer; the embodiment of FIG. 24 including features that cooperate with features of the tray of FIGS. 11-15 to reduce the potential for diversion of materials stored in the tray by an individual.
Figure 25:
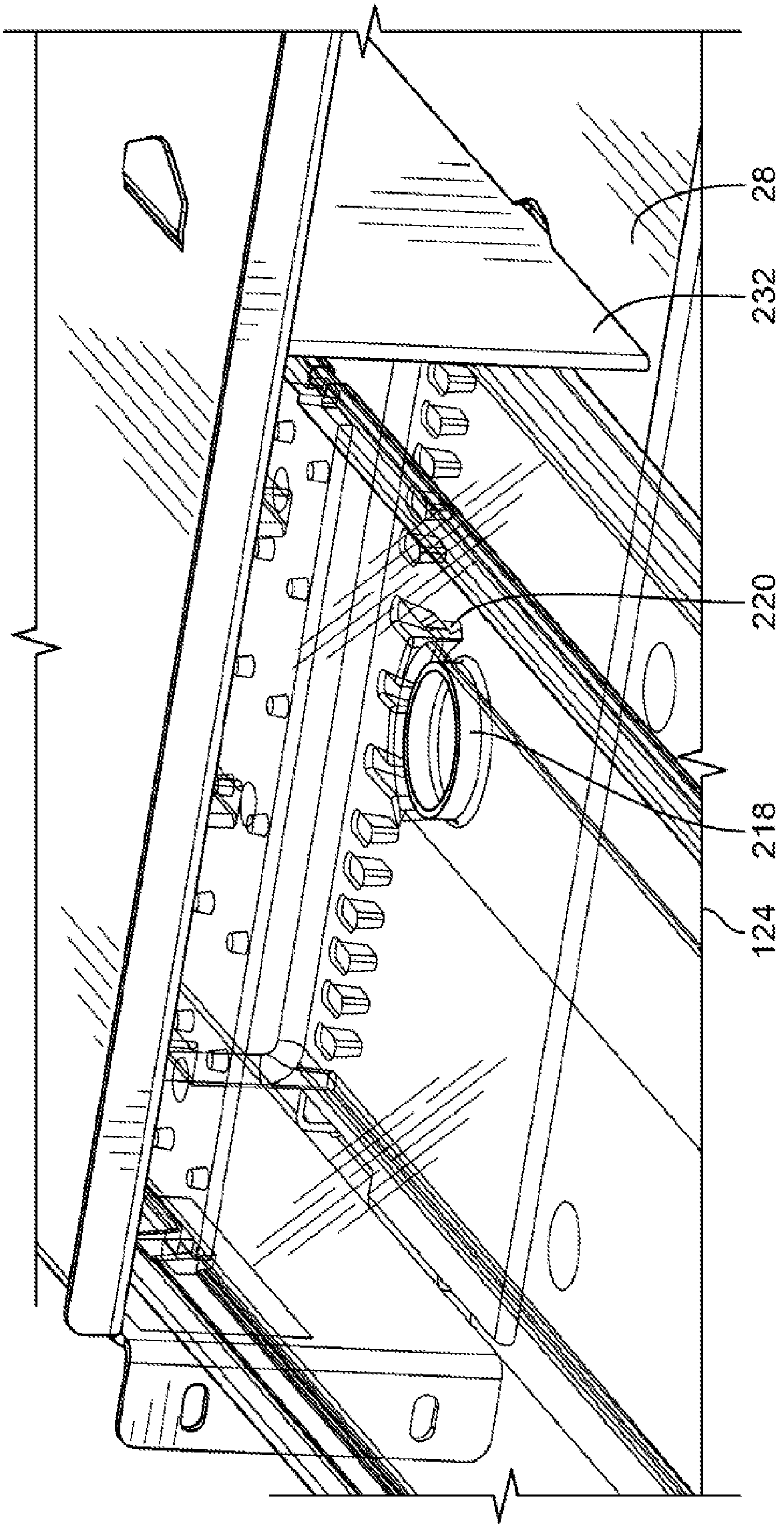
FIG. 25 is a close-up view of a portion of the embodiment of FIG. 24.

The tray 124 further includes a channel 216 formed in the lower surface 204. The function of the channel 216 will be described with respect to optional slide stops 218 formed in the surface 28 of the drawer 230 as shown in FIG. 24. For ease of discussion, the tray 124 is shown to be transparent in FIGS. 24 and 25. The slide stops 218 are formed by a metal working operation that extrudes the slide stops 218. The slide stops 218 cooperate with the channel 216 to help guide the tray 124 into and out of the compartment 32. The slide stops 218 help maintain the orientation of the tray 124 as it moves into and out of the compartment 32. Referring again to FIG. 26, the tray 124 includes a semi-circular catch 220 that engages a respective slide stop 218 when the tray 124 is removed from a compartment 32. Referring to FIG. 13, there is a portion 222 of the side wings 196, 198 that has a reduced height generally in the central region of the length of the tray 124. This reduction in height allows the tray 124 to be tilted when it is partially removed from the compartment 32 so that the catch 220 may be moved to a position higher than the respective slide stop 218 and fully removed from the compartment 32. The slide stop 218 and catch 220 tend to make the tray 124 harder to remove from the compartment 32 so that a tray 124 cannot be quickly removed and diverted. When tray 124 is mated with cover 128 (occurring after tray 124 has been inserted into compartment 32), that combined assembly cannot be removed from compartment 32 as tray catch 220 engages and cannot maneuver around stop 218.

Figure 29:
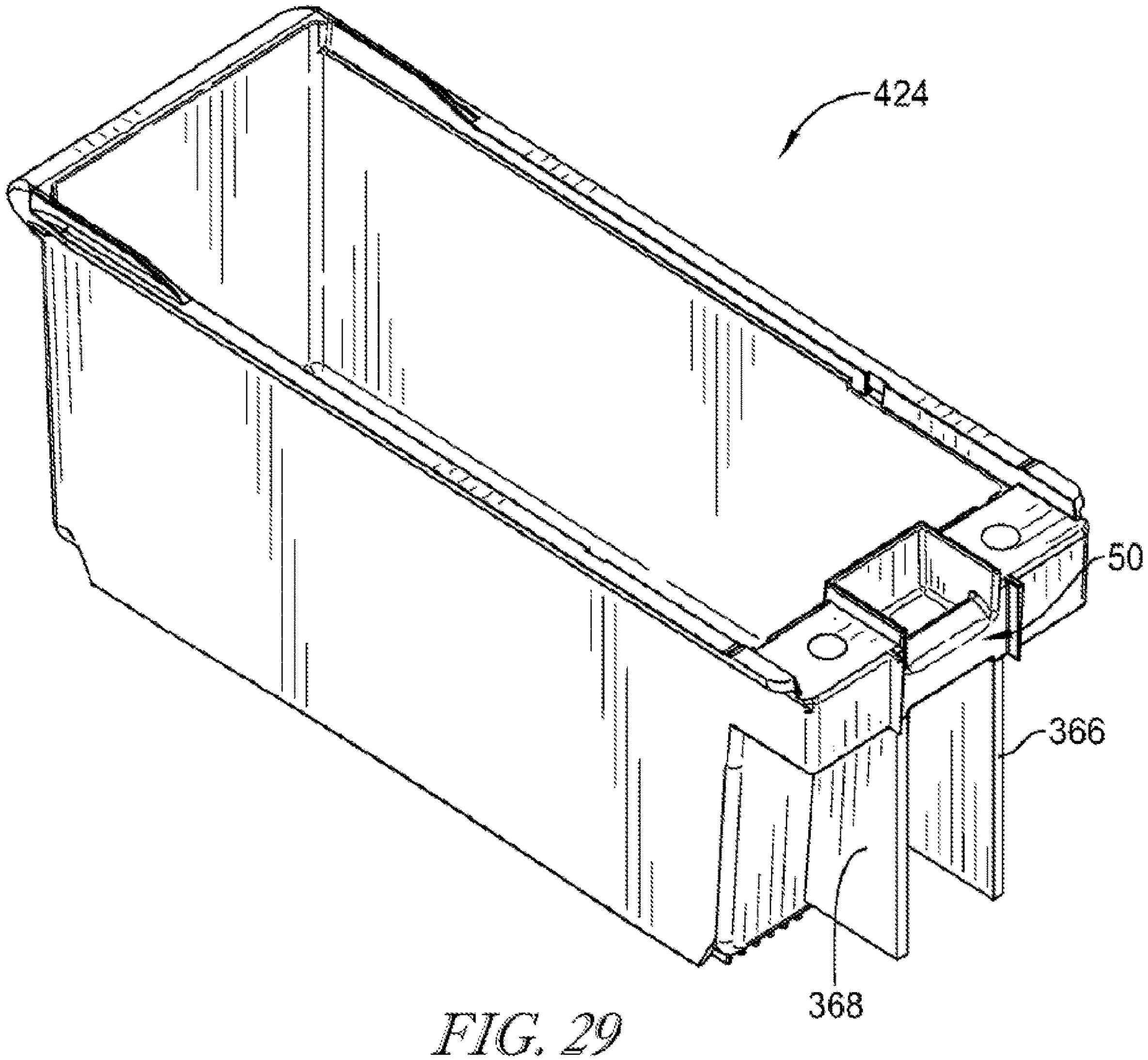
FIG. 29 is a perspective view of another embodiment of storage container that has a deeper depth, the storage container of FIG. 29 formed to include two wings on opposite sides of a retainer and extending downwardly, the wings configured to reduce the potential for tampering with a latch that engages the receiver.

Referring to FIG. 29, another embodiment of a tray 424 has a deeper storage space and is configured to be stored in a drawer/module that has a deeper depth. The tray 424 includes lateral wings 366 and 368 that extend downwardly from opposite sides of the retainer to provide a barrier to any illicit devices that may be inserted into the drawer/module in an attempt to release the tray 424 by activating a latch or actuator.

Referring now to FIGS. 11 and 12, another embodiment of a latch 240 is shown in cross-section. The latch 240 is an injected molded plastic component with a front nose surface 242 that assists with displacing the latch 240 upwardly when a tray 124 is slid into the enclosure 32. A catch portion 242 engages the retainer 50 when the tray 124 is in the stored position shown in FIG. 11. A region 248 above the catch portion 242 is specifically sized to be frangible at a particular load, as will be discussed in further detail below. The latch 240 pivots about an axis 246 when a link 84 or plunger 26 engages an arm 244 of the latch 240 as shown in FIG. 12.

Figure 22:
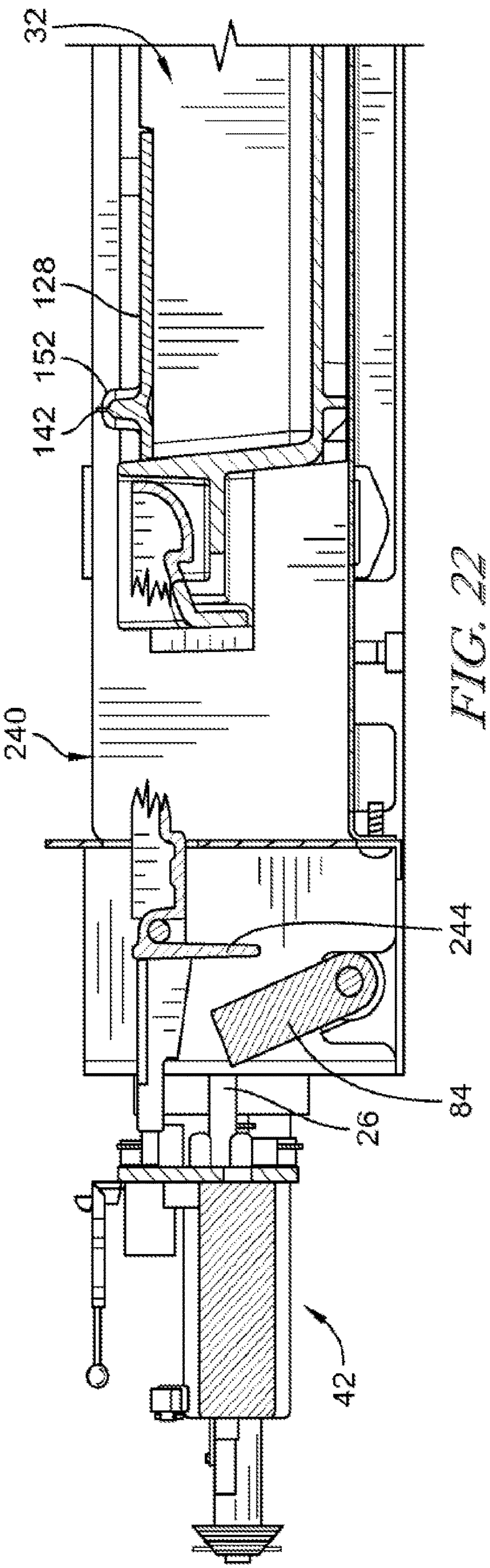
FIG. 22 is a view similar to FIG. 21 showing the effect of excessive force being applied to the tray to thereby cause a frangible portion of the latch to purposefully fracture to render the latch inoperable.

The latch 240 is configured to fail if an excessive load is applied to the tray 124 in an attempt to remove the tray 124 from a compartment 32 illicitly. Referring now to FIG. 21, if a load 250 is applied, a surface 252 of the catch portion 242 engages the surface 254 of the retainer 50 causing a tension load to be applied to the latch 240. The region 248 is sized to fail under a specific load, such as three-hundred (300) pounds, for example, so that the latch 240 is inoperable if the tray 124 is removed by force as shown in FIG. 22. In this way, the tray 124 cannot be removed so that medical products 132, 134, 136, or 138 can be removed and returned without detection. The tray 124 is configured to withstand a load substantially larger than the load required to break the frangible region 248 of the latch 240. This provides a de facto method of determining if a storage location has been tampered with by force.

In some embodiments, the drawer 30 may be modified like the drawer 230 shown in FIG. 24 to include the slide stops 218. Additional modifications may include the compartment walls 232, 234 of drawer 230 which limit the movement of a particular tray 124 in a compartment so that the tray 124 cannot be moved side to side to dislodge it from the latch 40, or the latch 240. The drawer 230 also includes a set of flanges 236, 238 positioned on the back side of the drawer 230 between solenoids 42 so that a user cannot tamper with the solenoids 42 to move the plungers 44 to release a particular tray 124. Flanges 236 and 238 also serve as blockers preventing cross-illumination between compartments 32 when illuminated by control board 27 of FIG. 7.

Figure 23:
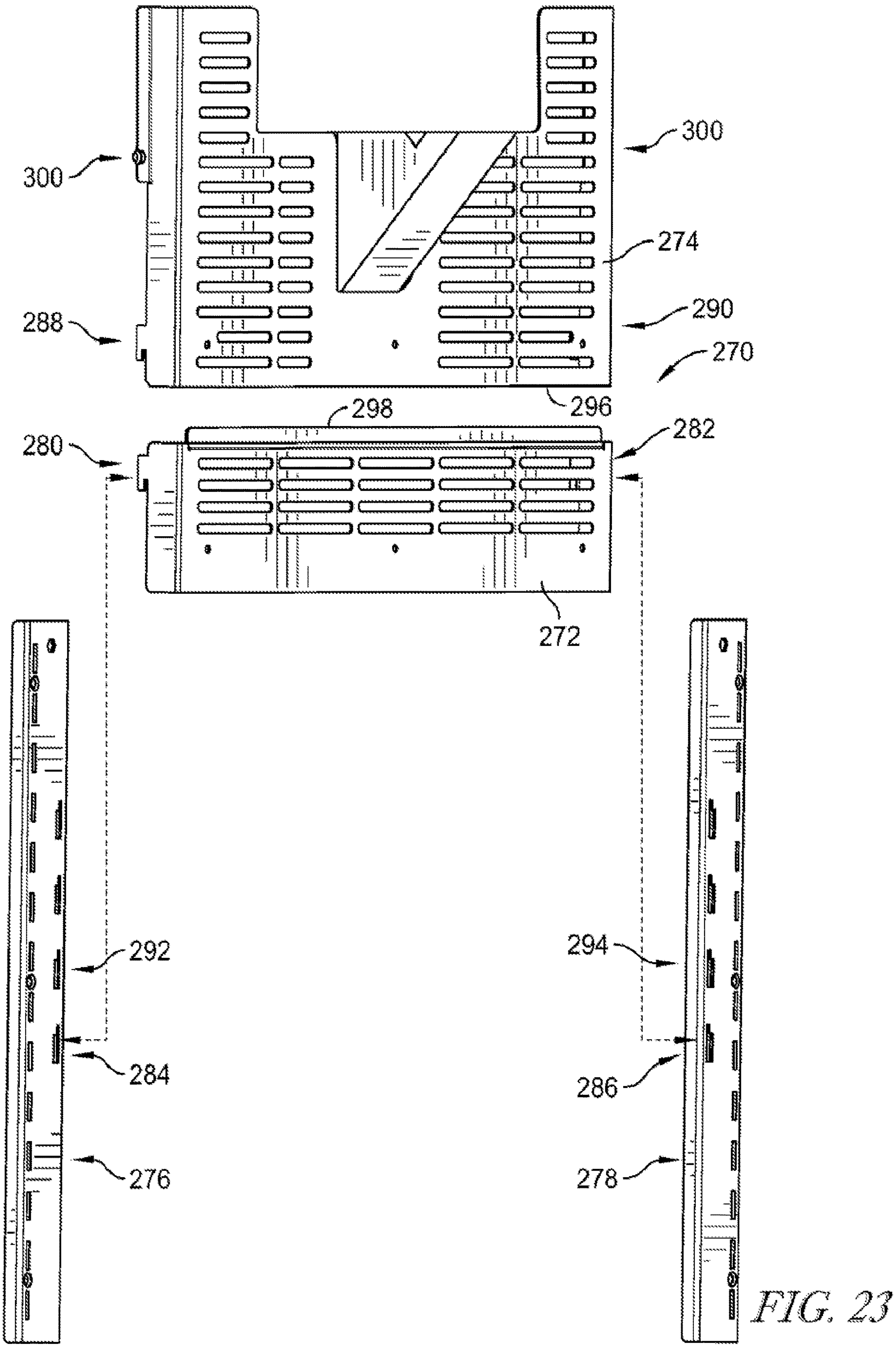
FIG. 23 is an exploded view of optional elements of grate assembly for use as a back wall of a storage device, the elements of the grate assembly of FIG. 23 being configured to reduce the potential for an individual to by-pass the grates to illicitly release trays stored in the storage device.

In another potential modification, a reinforced grate structure 270 shown in FIG. 23 may be used to form the back wall 34 of the storage space 20 of the storage device 10. Referring to FIG. 23, the grate structure 270 includes multiple panels 272, 274 of a reduced size so that they are less pliable. A lower panel 272 is positioned onto a pair of rails 276, 278 mounted to the enclosure 16. A pair of tabs 280, 282 are received in respective slots 284, 286 in the rails 276, 278. The lower panel 272 is relatively rigid. An upper panel 274 engages the lower panel 272 and has tabs 288, 290 that are received in slots 292, 294 of the rails 276, 278. Specifically, a lower edge 296 of the upper panel 274 overlies a lip 298 of the lower panel 272 so that pushing on location 296 does not open a gap between 272 and 274 such that hands or a wire cannot be slipped between the panels 272, 274. In addition, the structure of the rails 276, 278 and the panels 272, 274 have sufficient rigidity to prevent displacement to make gaps that could be exploited to surreptitiously used to provide path for a wire or other device to release a respective latch 40 or 240. The upper panel 274 is further secured to the rails 276, 278 by set of fasteners 300. A middle filler panel (not shown) can be located between 272 and 274 that is used for each drawer 30 or 230 that is omitted from the maximum number of drawers 30 or 230 that can be included within a storage device 10.

Figure 18:
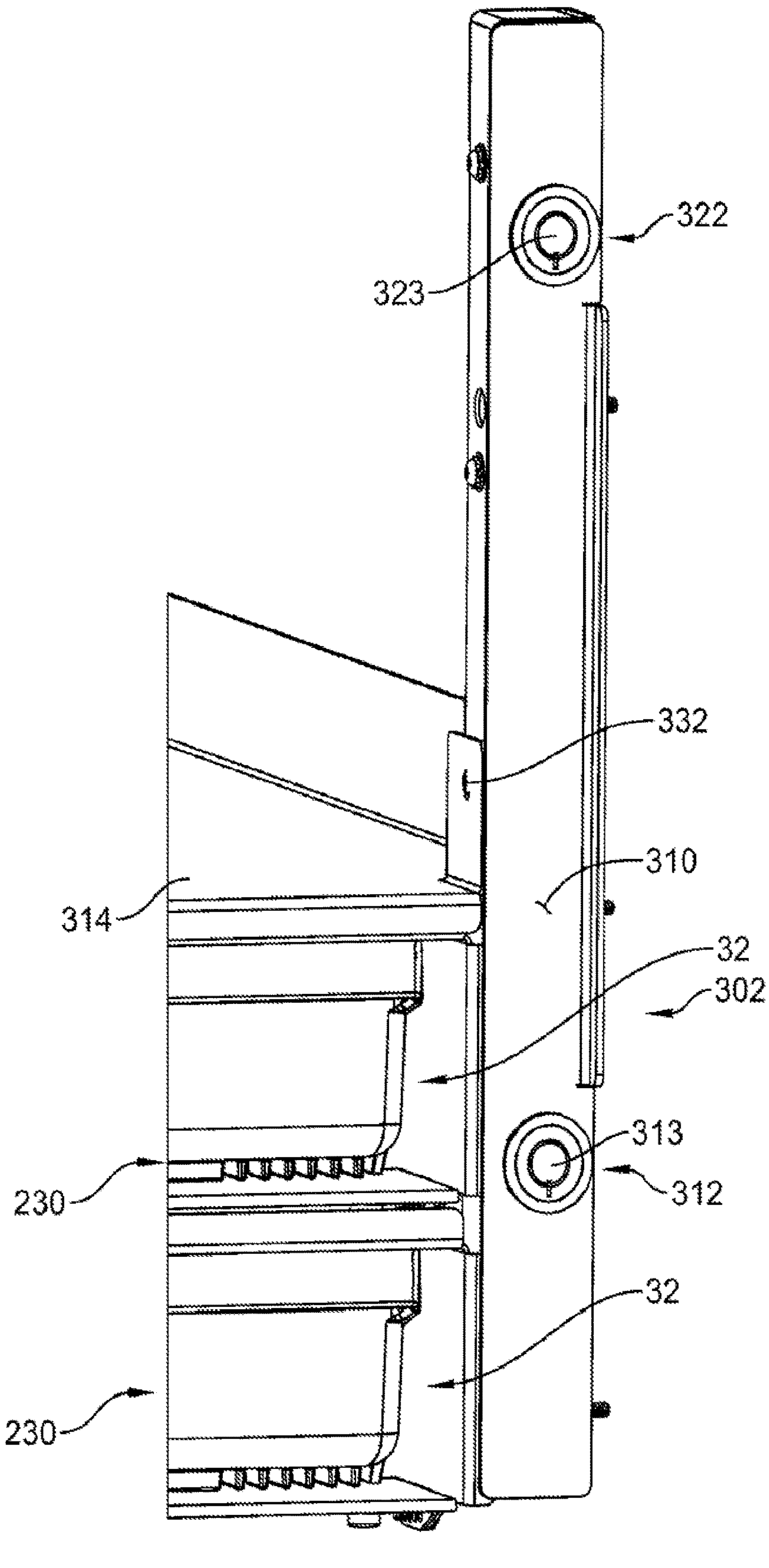
FIG. 18 is a perspective view of a portion of an alternative embodiment of a security and override assembly for trays positioned in a storage device.
Figure 19:
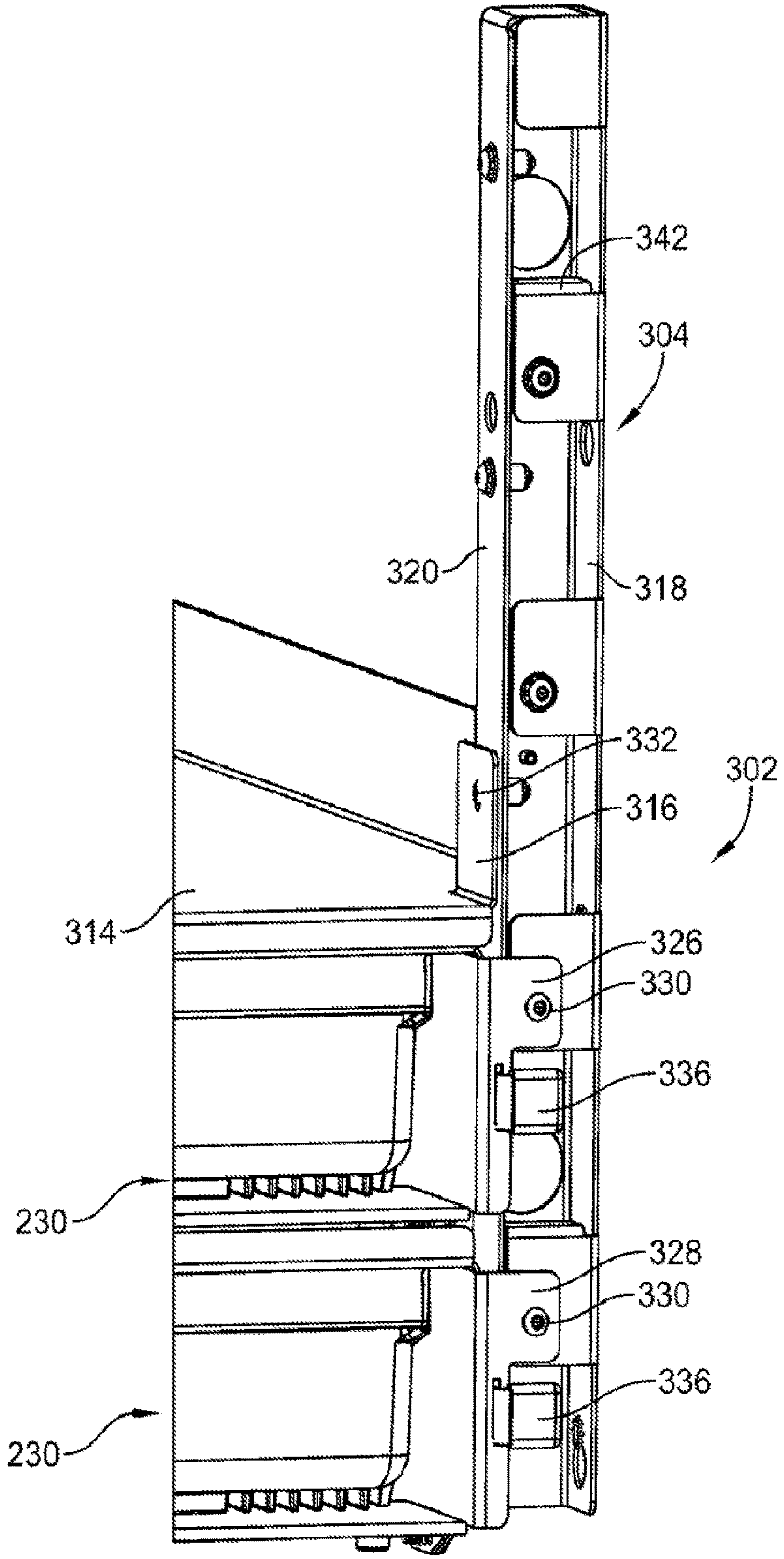
FIG. 19 is a perspective view similar to FIG. 18, a security cover of the security and override assembly being removed.

The drawers 230 are secured in the storage space 20 in a manner different from that shown relative to the embodiment of drawers 30. Referring to FIG. 18, two drawers 230 are shown to be coupled security and override system 302. The system 302 includes a cover 310 that is removably coupleable to a frame 304. The cover 310 supports two locks 312, 322 that each have a respective security interface 313, 323 that requires a special tool/key (not shown) to engage the respective security interface 313, 323 to move the locks 312, 322 between released and secured positions. Referring now to FIG. 19, the frame 304 includes two catches 340, 342 which are positioned to be engaged by the respective locks 312, 322 to secure the cover 310 to the frame 304 and thereby cover the various fasteners and override handles 336 discussed below.

Figure 20:
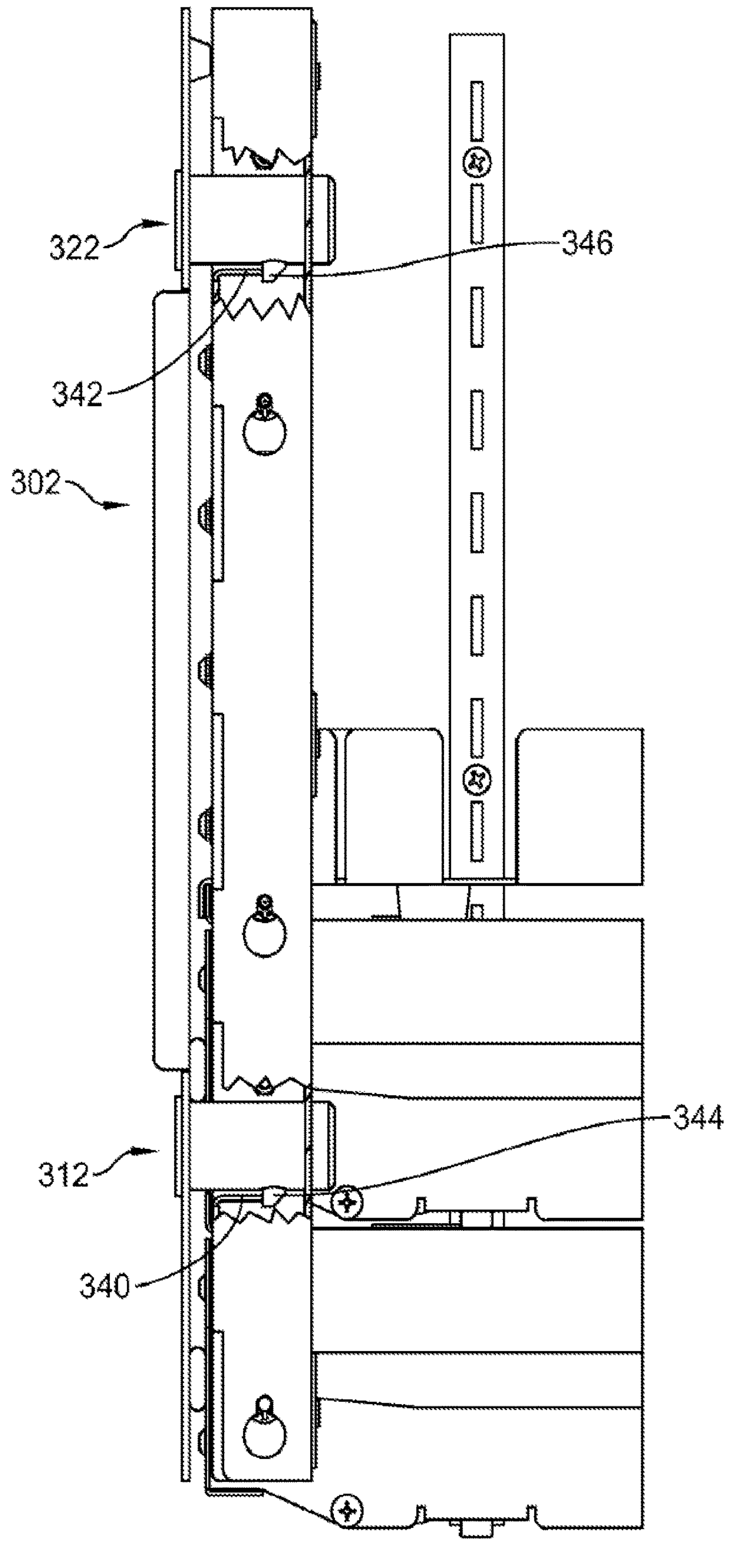
FIG. 20 is side view of the security and override assembly of FIGS. 18-19 with portions removed in FIG. 20 to show the operation of locks secured to the security cover.

Referring to FIG. 20, the locks 312, 322 each include respective actuators 344, 346 which extend when the security interfaces 313, 323 are moved to a locked position. As shown in FIG. 20, the actuators 344, 346 engage the respective catches 340, 342 to secure the cover 310 to the frame 314.

Figure 27:
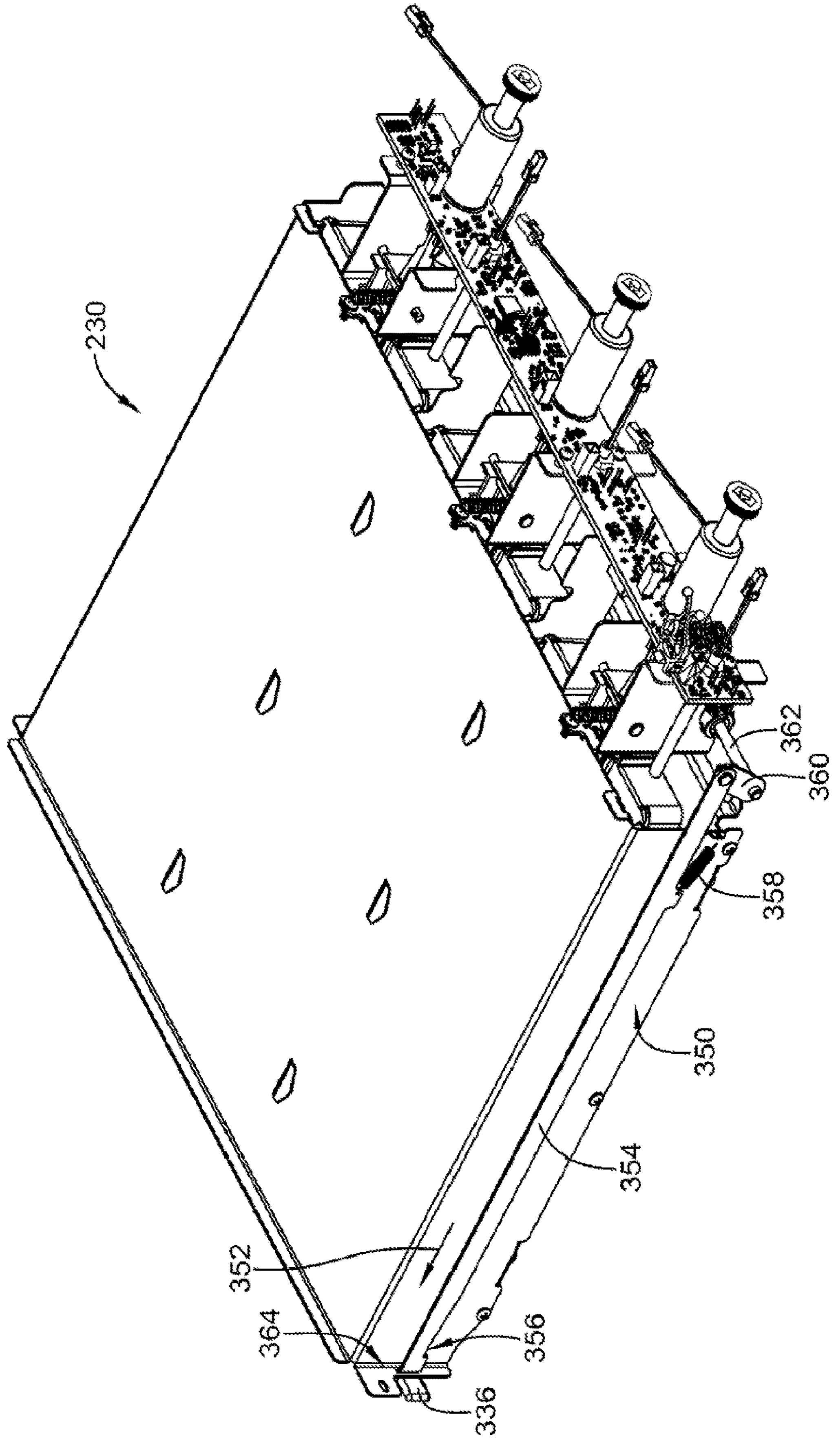
FIG. 27 is a perspective view of the drawer of FIG. 25, the view of FIG. 27 including an override structure for manually releasing the trays of the drawer shown in a non-released position.
Figure 28:
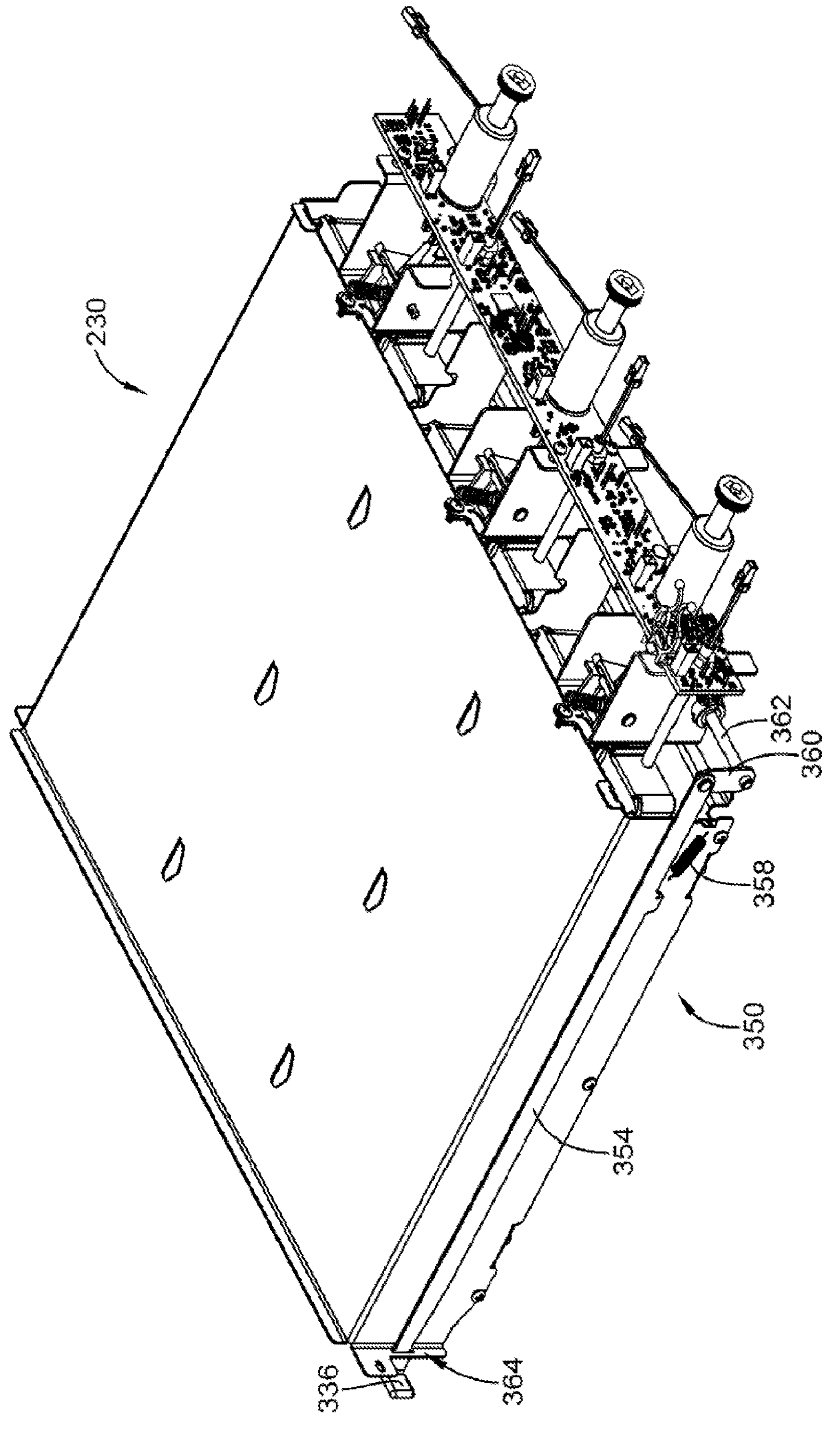
FIG. 28 is a view similar to FIG. 27, the override structure of FIG. 28 shown in a released position.

The drawers 230 are secured to the frame 304 by fasteners 330 that secure a flange 328 of each drawer 230 to the frame 304. Referring to FIGS. 27 and 28, each drawer 230 also includes an override mechanism 350 that is similar to the override mechanism 68 discussed above, but the override mechanism 350 is manually actuable after the cover 310 is removed. The override mechanism 350 includes the handle 336 which is accessible by a user as shown in FIG. 19. A user pulls the handle 336 in the direction of an arrow 352, a link 354 is moved. The motion of the link 354 is transferred through a link 360 to a shaft 362. The shaft 362 is similar to the shaft 80 shown in FIG. 7 in that the shaft 362 moves the links 94 to cause the latches 240 of drawer 230 to be moved to the released position. The link 354 is engaged with a spring 358 which biases the link 354 to the position shown in FIG. 27. The link 354 is guided by a slot 364 and includes a catch 356 which is engageable with a lower edge of the slot 364 to secure the override mechanism 350 in a released position as shown in FIG. 28. This allows a user to override the security of the entire drawer 230 so that the trays 124 can be moved into and out of the compartment 32 without having the latches 240 engaged. This may be suitable, for example, when the materials stored in the tray 124 do not have to be controlled. In addition, this is useful in an emergency, such as a loss of power, to allow the trays 124 to be removed without having to actuate the override mechanism 350 for each tray 124.

It should be understood that the present disclosure provides a cost effective method for storing high value materials that require access control and a refrigerated environment by have a relatively small storage space adaptable for specific uses. The various tamper resistant features discussed above provide a diversion resistant storage system which deters or prevents illicit diversion of the stored materials and, in some embodiments, for recording access to the various storage spaces. Many of these features may be used singularly or in cooperation with other features to provide various levels of diversion resistance, so as to tailor the device to a particular potential diversion scenario.

Although this disclosure refers to specific embodiments, it will be understood by those skilled in the art that various changes in form and detail may be made without departing from the subject matter set forth in the accompanying claims.

What is claimed is:

1. A medical product storage device comprising:

an enclosure at least partially defined by a door; and a plurality of drawer assemblies positioned in the enclosure, each of the plurality of drawer assemblies defining a respective compartment within the enclosure, and each of the plurality of drawer assemblies including:

a plurality of storage containers positioned within the compartment, wherein each of the plurality of storage containers includes a bottom surface having a plurality of ribs spaced along a width of the storage container, wherein the plurality of ribs are configured to at least partially block access to a back end of the storage container along the bottom surface; and a plurality of actuators that are coupled to a back end of the drawer assembly that is spaced from the door such that each of the plurality of actuators is configured to selectively secure or release a respective storage container of the plurality of storage containers relative to the compartment, and such that the drawer assembly is configured to be removed from the enclosure as a unit with the plurality of actuators.

2. The medical product storage device of claim 1, wherein each of the plurality of drawer assemblies further comprises a separate override mechanism that is configured to release each of the plurality of storage containers relative to the compartment independent of the plurality of actuators.

3. The medical product storage device of claim 2, wherein each override mechanism includes a user interface that is configured to be manually manipulated to release each of the plurality of storage containers relative to the compartment.

4. The medical product storage device of claim 3, wherein the user interface comprises a key actuated lock.

5. The medical product storage device of claim 1, wherein the plurality of ribs includes a first set of parallel ribs positioned at a front end of the bottom surface and a second set of parallel ribs positioned at the back end of the bottom surface, and wherein each of the first set of ribs and each of the second set of ribs is elongated along a longitudinal direction of the corresponding storage container.

6. A medical product storage device comprising:

an enclosure at least partially defined by a door;

a plurality of drawer assemblies positioned in the enclosure, each of the plurality of drawer assemblies including:

a frame that is removable from the enclosure independent of a remainder of the plurality of drawer assemblies, the frame defining a compartment having a front end that is proximate to the door and a back end that is distal from the door;

one or more storage containers positioned in the compartment, wherein each of the one or more storage containers includes:

a top side;

a retainer that is configured to engage with a corresponding latch; and one or more upward extending wings at least partially surrounding the retainer on the top side to at least partially block access to the retainer; and an actuation system connected to and carried on the frame, the actuation system including:

one or more latches that are configured to engage with the one or more storage containers along the back end of the compartment to secure the one or more storage containers in the compartment; and one or more actuators that are each configured to release a respective latch of the one or more latches to release a respective storage container of the one or more storage containers from the compartment.

7. The medical product storage device of claim 6, wherein each of the plurality of drawer assemblies further comprises a separate override mechanism that is configured to release each of the one or more latches from the one or more storage containers independent of the one or more actuators.

8. The medical product storage device of claim 7, wherein each override mechanism is carried on the frame of the respective drawer assembly so that each override mechanism is removable from the enclosure with the corresponding frame.

9. The medical product storage device of claim 6, wherein each of the one or more storage containers includes:

an opening on the top side;

a cover extending across the opening along the top side; and a spacer extending upward from the cover to at least partially block access to the retainer, wherein the spacer comprises a wall that extends in a perpendicular direction relative to a longitudinal axis of the storage container.

10. The medical product storage device of claim 6, wherein each of the one or more storage containers has a bottom surface that includes a plurality of ribs spaced along a width of the storage container that are configured to at least partially block access to the respective latch of the plurality of latches.

11. A medical product storage device comprising:

an enclosure at least partially defined by a door; and a drawer assembly positioned in the enclosure, the drawer assembly including:

a frame defining a compartment having a front end proximate to the door and a back end distal from the door;

one or more storage containers positioned in the compartment; and an actuation system including:

one or more latches that are configured to engage with the one or more storage containers at the back end to secure the one or more storage containers in the compartment;

one or more actuators mounted to the frame such that the one or more actuators are removable from the enclosure along with the frame, the one or more actuators configured to selectively release the latches from the one or more storage containers; and an override mechanism mounted to the frame such that the override mechanism is removable from the enclosure along with the frame, and wherein the override mechanism is configured to release each of the one or more latches from the one or more storage containers independent of the one or more actuators, wherein the override mechanism includes a user interface that is configured to be manually manipulated to release each of the one or more latches from the one or more storage containers, and wherein the override mechanism includes a user interface that is configured to be manually manipulated to release each of the one or more latches from the one or more storage containers.

12. The medical product storage device of claim 11, wherein each of the one or more storage containers has a bottom surface that includes a plurality of ribs spaced along a width of the storage container that are configured to at least partially block access to the respective latch of the one or more latches.

13. A medical product storage device comprising:

an enclosure at least partially defined by a door; and a plurality of drawer assemblies positioned in the enclosure, each of the plurality of drawer assemblies defining a respective compartment within the enclosure, and each of the plurality of drawer assemblies including:

a plurality of storage containers positioned within the compartment, wherein each of the plurality of storage containers includes an open top side, a closed bottom side, and a spacer extending upward from the top side that is configured to at least partially block access to a back end of the storage container, and wherein each of the plurality of storage containers includes a cover at least partially covering the open top side, wherein the spacer extends upward from the cover, and wherein the spacer comprises a wall that extends in a perpendicular direction relative to a longitudinal axis of the corresponding one of the plurality of storage containers; and a plurality of actuators that are coupled to a back end of the drawer assembly that is spaced from the door such that each of the plurality of actuators is configured to selectively secure or release a respective storage container of the plurality of storage containers relative to the compartment, and such that the drawer assembly is configured to be removed from the enclosure as a unit with the plurality of actuators.

14. A medical product storage device comprising:

an enclosure at least partially defined by a door; and a plurality of drawer assemblies positioned in the enclosure, each of the plurality of drawer assemblies defining a respective compartment within the enclosure, and each of the plurality of drawer assemblies including:

a plurality of storage containers positioned within the compartment;

a plurality of actuators that are coupled to a back end of the drawer assembly that is spaced from the door such that each of the plurality of actuators is configured to selectively secure or release a respective storage container of the plurality of storage containers relative to the compartment, and such that the drawer assembly is configured to be removed from the enclosure as a unit with the plurality of actuators; and a separate override mechanism that is configured to release each of the plurality of storage containers relative to the compartment independent of the plurality of actuators, wherein each override mechanism includes a user interface that is configured to be manually manipulated to release each of the plurality of storage containers relative to the compartment, and wherein the user interface comprises a handle that is occluded by a cover within the enclosure.

* * * * *